United States Patent [19]

Iwamura et al.

[11] Patent Number: 5,602,564

[45] Date of Patent: Feb. 11, 1997

[54] GRAPHIC DATA PROCESSING SYSTEM

[75] Inventors: Kazuaki Iwamura, Kodaira; Takehiro Fujita, Kokubunji; Tsuneya Kurihara, Tokyo, all of Japan

[73] Assignee: Hitachi, Ltd., Tokyo, Japan

[21] Appl. No.: 974,128

[22] Filed: Nov. 10, 1992

[30] Foreign Application Priority Data

Nov. 14, 1991 [JP] Japan .................................. 3-298777
Nov. 14, 1991 [JP] Japan .................................. 3-298780

[51] Int. Cl.$^6$ .............................. G09G 5/00; G06F 15/00
[52] U.S. Cl. ......................... 345/119; 345/139; 395/119; 395/344
[58] Field of Search .................................. 345/118, 119, 345/120, 126, 127, 139, 133; 395/157, 158, 119, 120

[56] References Cited

U.S. PATENT DOCUMENTS

| | | | |
|---|---|---|---|
| 4,555,775 | 11/1985 | Pike | 345/120 |
| 4,875,034 | 10/1989 | Brokenshire | 345/120 |
| 4,907,174 | 3/1990 | Priem | 345/139 |
| 4,965,558 | 10/1990 | Saki et al. | 345/127 |
| 5,038,138 | 8/1991 | Akiyama et al. | 345/119 |
| 5,045,844 | 9/1991 | Takano | 345/126 |
| 5,148,154 | 9/1992 | MacKay et al. | 345/146 |
| 5,325,470 | 6/1994 | Sumino et al. | 395/119 |
| 5,334,994 | 8/1994 | Takagi | 345/120 |

FOREIGN PATENT DOCUMENTS

| | | |
|---|---|---|
| 60-501232 | 8/1985 | Japan . |
| 62-274469 | 11/1987 | Japan . |
| 63-133275 | 6/1988 | Japan . |
| 1-166265 | 6/1989 | Japan . |
| 1-180343 | 7/1989 | Japan . |
| 2-24784 | 1/1990 | Japan . |
| 2-165390 | 6/1990 | Japan . |
| 2-239363 | 9/1990 | Japan . |

OTHER PUBLICATIONS

*I.E.E.E. Computer Graphics and Applications,* "Window Interfaces A Taxonomy of Window Manager User Interfaces", Brad A. Myers, pp. 64–84, Sep. 1988.

"Towards Higher Utilization of Graphic Image Media" (1990, items 49–54) of Papers of Functional Graphic Data Symposium.

"Graphics and CAD 49-3", (1991, items 1–8) of Research Documents of Data Processing Society.

Documents of Serromechanism Association (1990, items 11–14).

"Graphics and CAD 49-8" (1991, items 1–8) of Research Documents of Data Processing Society.

*Primary Examiner*—Richard Hjerpe
*Assistant Examiner*—Kara Farnandez Stoll
*Attorney, Agent, or Firm*—Fay, Sharpe, Beall, Fagan, Minnich & McKee

[57] ABSTRACT

This invention relates to a graphic data processing system, and is more particularly directed to provide an easy-to-operate system and displaying method thereof, for generating scene data from map data and retrieving and displaying attributes containing guide information of ground objects in a scene. In the first place, when a visual point is directed from above to below, a planar map is displayed, and as the visual point shifts in a horizontal direction, a three-dimensional scene image is generated and displayed from a map. Secondly, a three-dimensional window is displayed in a display, and graphic data is displayed inside the window.

9 Claims, 24 Drawing Sheets

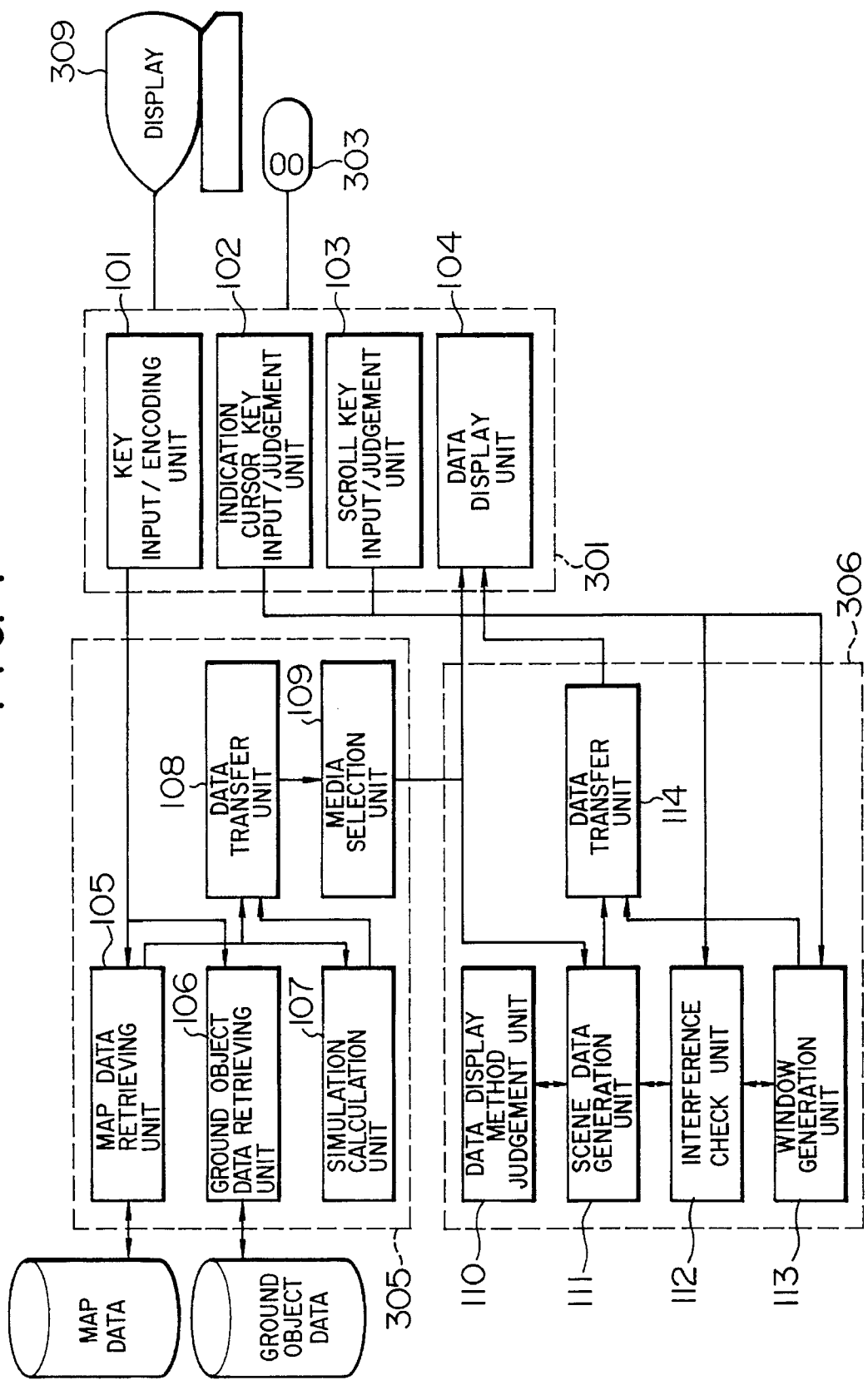

SCENE DISPLAY

INDICATION CURSOR 501

MAP DISPLAY 1302  1301
INDICATION CURSOR 1304  1301

1304

F I G. 17
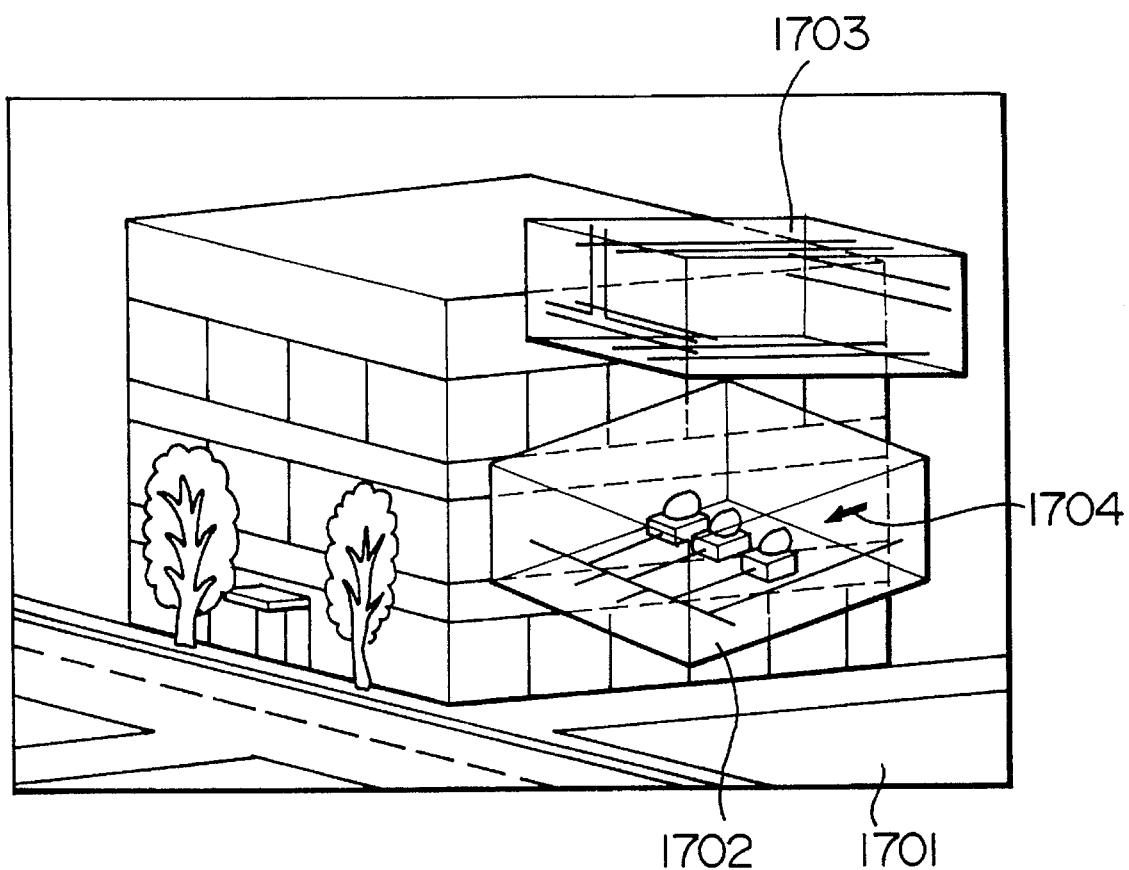

GRAPHIC DATA PROCESSING SYSTEM

BACKGROUND OF THE INVENTION

This invention relates to a system which displays planar map data and cubic scene data on a graphic display, conducts normally a sight-seeing guide and shows the way, while it performs evacuation guidance in case of emergency. More particularly, the present invention relates to a method which improves operability of the system by a user.

The present invention relates also to a system for displaying a window having a three-dimensional shape in a scene displayed in a graphic display, and particularly to a method for improving efficiency in operating data displayed in a display and improving further visuality.

The prior art from the first aspect includes the following systems.

Systems for displaying a scene from a vector map and for retrieving a route on a map and displaying multi-media information such as a photo of a landscape near the route are described in "Towards Higher Utilization of Graphic Image Media" (1990, pages 49 to 54) of Papers of Functional Graphic Data Symposium and in "Graphics and CAD 49-3" (1991, pages 1 to 8) of Research Documents of Data Processing Society. Graphic image display, interface and systems in accomplishing virtual reality display of scene data are described in Documents of Servomechanism Association (1990, pages 11 to 14) and in "Graphics and CAD 49-8" (1991, pages 1 to 8) of Research Documents of Data Processing Society.

However, the prior art based on the first aspect is primarily directed to the conversion of a planar map to a cubic scene and to its display, but does not disclose a system for accomplishing simultaneously the characterizing features of both of them. That is, high visuality of a topological arrangement relation between figures in the case of the planar map and sensorial easiness in the case of the cubic map are provided on one system. As to the virtual reality system, a report has been made on the movement of an object in the virtual world displayed graphically, a contact method by a user to the object using a head mount type sensor device or a glove type sensor device, and display of its reaction, but no method has been reported which generates a new space in the virtual word expressed by scenes and displays additional attributes in another world in the virtual world by the use of windows.

As the prior art based on the second aspect, a display method of a window on a display and a method of using the window in computer graphics and topographic data processing are known as listed below.

Display method:

(1) a method which divides a main data display area from a window display area;

(2) a method which displays overlappingly the window with the main data display area. The window display method (1) is the system which secures in advance another region as a window region 1802 separately from a main data display region 1801 of a display screen for displaying main data as shown in FIG. 18, executes data processing in the main data display region 1801 in the interlocking arrangement with the data processing in the window display region 1802 or preferentially executes data processing in either of the regions. JP-A-2-165390 displays a map in such a window in order to determine the visual point of a three-dimensional object and its visual line, and recognizes the visual point and line in accordance with the way of watching the map.

[Column 2]

The window display method (2) has its feature in that the window area is displayed inside the display screen of main data. JP-A-1-180343 employs a window in order to display an enlarged view, and adaptively changes the size of the window lest a region which is to be enlarged overlaps with the window display region as shown in FIG. 19. In FIG. 19, reference numeral 1901 denotes a main data display region, reference numeral 1902 denotes a display region to be enlarged and reference numeral 1903 does a window display region (display in enlargement).

As to the methods of using the window, there are the following two methods.

(1) a method which displays data in the window; and (2) a method which regards the window as another world, activates a program linked with the window, and activates and executes a different program for each window.

The window using method (1) uses the window as a system which enables a user to easily watch the data, and JP-A-1-180343 discloses one of such examples.

The window using method (2) uses the window as a user interface for developing and executing a plurality of programs on one computer in a computer system capable of executing multi-task processings.

In the prior art based on the second aspect, the window displaying method (1) involves the problem that the main data display region becomes small because the display screen is used after being divided. The window displaying method (2) does not divide the display screen and has the merit that the display can be watched easily. However, the shape of the window is two-dimensional inside the display, and even three-dimensional data are given to the user as an image obtained by projecting the three-dimensional data on the two-dimensional window. Accordingly, when an access is made to the three-dimensional data displayed in the window by the use of a pointing icon so as to rotate the three-dimensional data having a complicated shape or to change its size, a complicated interference check with the data is necessary, and recognition of the visual line and point is difficult.

As described above, the window shape is two-dimensional in the window using method (1), and the window using method (2) does not relate to the display of the data. In this way, the prior art has failed to efficiently manipulate the three-dimensional data.

SUMMARY OF THE INVENTION

It is a first object of the present invention to provide a system which can shift and utilize both planar and cubic media without any malaise by moving the visual point of a user when a visual scene is generated using map data and can select a medium easily comprehensible to the user, and a system and method friendly to the user by displaying a rectangular or parallelepiped window inside the scene and displaying a document, a figure, an image, etc, inside the window. This system can be utilized also as a virtual reality system, and is an easy-to-operate visual interface for the user not using conventional input devices such as keyboards and mouses.

It is a second object of the present invention to provide a system which improves efficiency for operating data displayed on a display and improving further visuality.

According to the first aspect of the present invention, there is provided a graphic data processing system which comprises means for retrieving vector map data; means for generating scene data from the retrieved vector map data; means for projecting and displaying the generated scene data on a two-dimensional plane determined by position and direction of a visual point; means for changing the position or direction of the visual point; and means for selecting a display method which generates the scene data from the vector map data by the use of the scene data generation means on the basis of a changed visual point when the visual point is changed from a vertical direction to a horizontal direction by the use of the visual point change means, and a display method which displays the vector map data in place of the scene data on the display means when the visual point is changed from a horizontal direction to a vertical direction by the use of the visual point change means.

In other words, when the visual point is directed from above to below, the image is displayed by the planar map and as the visual point moves towards the horizontal direction, the three-dimensional scene image is generated and displayed from the map.

In a more definite embodiment, a pointing system is employed in which an indication cursor is displayed to display attributes in the scene, and a ground object such as a building existing in the direction of the indication cursor is retrieved from the map data in accordance with the direction of the cursor. Furthermore, a three-dimensional window is calculated, and is preferentially displayed by effecting interference check with the ground object in the scene so that media such as figures and images can be displayed and the display can be made without malaise from the scene. Since an object having the attributes to be displayed in the window is sometimes hidden by another ground object, such an object is retrieved from the map data, the display of the hiding object is changed from solid display to wire frame display and the object is thus high-lighted. Furthermore, the objects of the wire frame display are allowed to pass through without effecting the interference check while the objects of the solid display are not allowed to pass through by effecting the interference check, so that the user can utilize the system more realistically.

Since smooth movement between the planar map and the cubic map is insured by the movement of the visual point, the user does not lose his sight in both cases. Display can be made in the forms easily comprehensible to the user and print output becomes easier.

The three-dimensional window displays the attributes added to the ground object without any malaise with the scene. Any complicated operations are not required for selecting the ground object.

Because the execution of the interference check is switched depending on the difference of the forms of the wire frame display and the solid display, judgement of permission of the passage is easy, and any malaise that would otherwise occur due to the switch of the scene during display can be prevented.

From the second aspect of the present invention, there is provided a graphic data processing system which comprises a display for displaying graphic data and means for displaying a three-dimensional window on the display and also displaying graphic data in the window.

In a more definite embodiment, a three-dimensional parallelepiped window or windows are disposed in order to display a part of the graphic data displayed on the display screen or other graphic data, as shown in FIG. 17. Scroll bars, enlargement/scale-down selectors (keys), rods for rotating the window, rails for moving the window and means for connecting the movement of each icon with the movement of the three-dimensional window are added to the window so that the size and position of the window can be changed by making access to these operation icons without making direct access to the three-dimensional data inside the window, and along therewith, enlargement/scale-down, scroll, rotation and movement of the three-dimensional data can be carried out. The world displayed in the three-dimensional window is regarded as a different world from the world displayed outside the window by window management means and a window management table, and when the pointing icon is contained in the three-dimensional window, control of the data operation is switched by switching the control of a computer to the world in the window having higher priority. At this time, the program associated with the three-dimensional window, to which control shifts, can be activated.

Scroll, enlargement/scale-down and rotation of the three-dimensional data can be made by making access to the scroll bars, enlargement/scale-down selectors and rods added to the three-dimensional window, without the need of a direct access function to the data having a complicated three-dimensional shape and displayed inside the three-dimensional window. The position of the visual point and the direction of the visual line can be estimated easily from the display position and shape of the window displayed on the display.

Next, a plurality of worlds the data express can be displayed by the three-dimensional window. The user can select the world he is interested in from the relation of inclusion of the pointing icon with the three-dimensional window. When a plurality of three-dimensional data are displayed inside mutually different three-dimensional windows, the user can operate the program associated with the group of data in which he is interested in particularly.

BRIEF DESCRIPTION OF THE DRAWINGS

FIG. 1 is a functional view of a visual guide system according to the present invention;

FIG. 17 is an explanatory view showing an application example of a building management system of a three-dimensional window system;

DESCRIPTION OF THE PREFERRED EMBODIMENTS

The first embodiment of the present invention will be explained with reference to FIGS. 1 to 16.

Figure 2A:
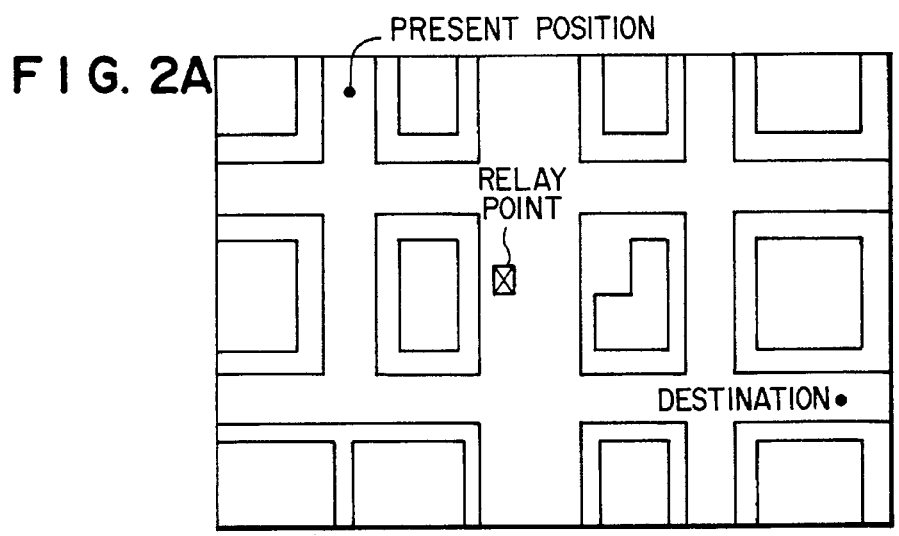
FIGS. 2A, B, C are explanatory views showing examples of use of a conventional guide system.
Figure 2B:
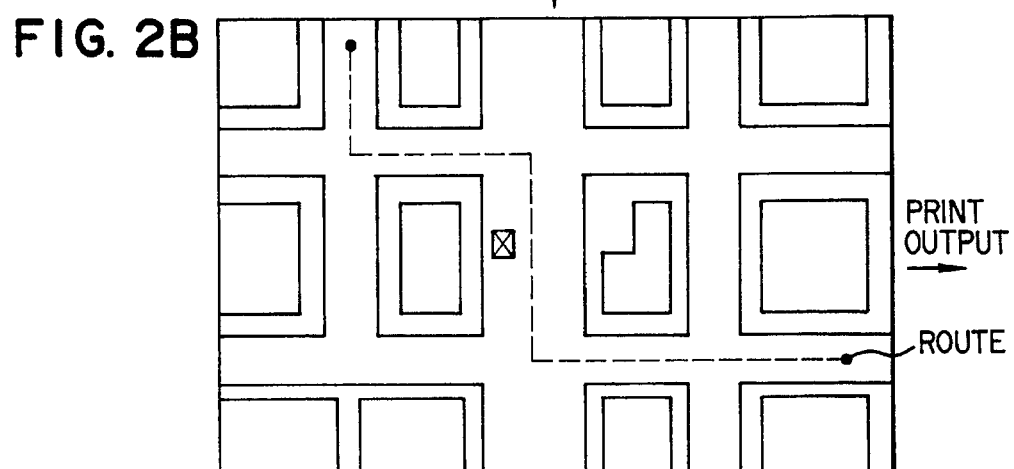
Figure 2C:
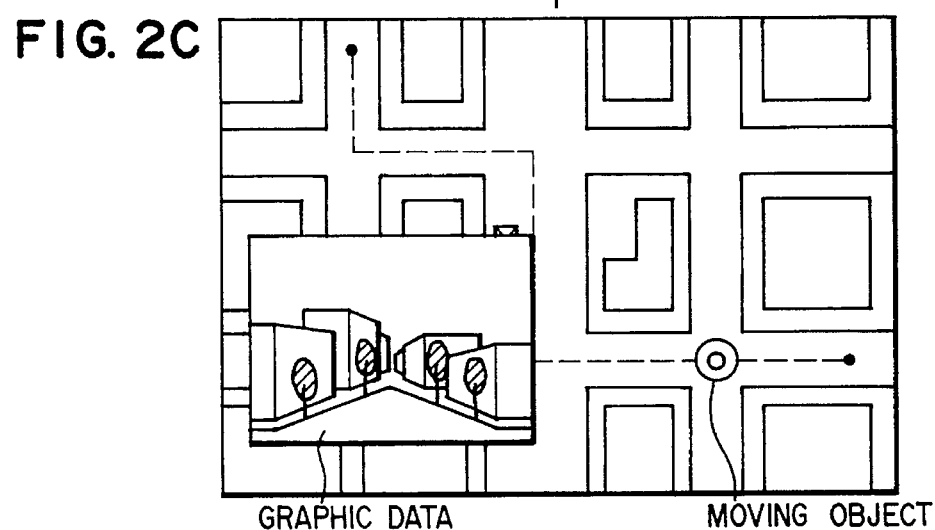

In a conventional guide system using map data shown in FIG. 2(a), a map is displayed on a graphic display, a route from the present position to the destination through a relay point is retrieved by inputting the present position, the relay point and the destination. In other words, this guide system is mainly directed to display the route on the map or to print out the retrieved route in superposition with the map as shown in FIG. 2(b). Alternatively, a document added to ground object data such as surrounding buildings and multimedia data such as a graphic image along the route obtained by calculation or a preset route is submitted to a user by display means such as a window, as shown in FIG. 2(c). In such a system, however, the map data is displayed merely as the background. Therefore, it is difficult to confirm the actual present position by the map alone, and when the route is displayed, too, it is rather difficult to establish a relation of correspondence to the route which is to be taken in practice. Since the conventional guide system is mono-functional, it can be used for limited applications such as a tourist guide, a road guide, and so forth, and cannot be used for many other purposes. This embodiment provides a three-dimensional reconstruction method of a map to cope with the former problem and a multi-purpose method which functions normally as a road guide system but functions as an evacuation guide system in case of emergency to cope with the latter problem.

Figure 3:
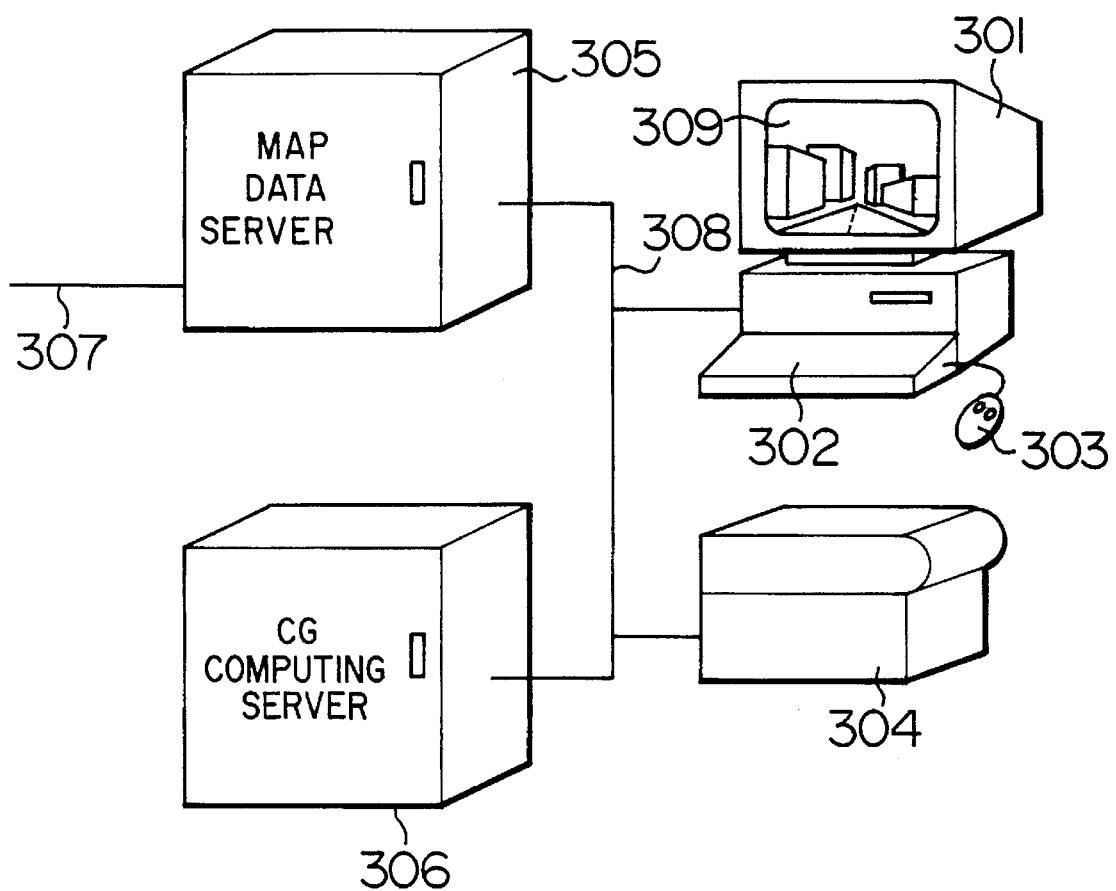
FIG. 3 is a structural view showing the construction of the visual guide system.

FIG. 3 is a structural view of a multi-purpose visual guide system for accomplishing the first embodiment of the present invention. A computer 301 is an interface device for the user, and the map data is displayed on this interface. The map data are vector data which are expressed by polygonal graphics by a coordinate system. The user inputs a key word for retrieving map and geographic attributes by the use of an input device such as a keyboard 302 or a mouse 303 to scroll the map and the scene, designates the map data and the scene data displayed on the display 309, and outputs the desired data by the use of a printer 304. A map data server 305 retrieves the ground object data (attribute data) linked with the map data and the ground object data displayed on the display 309, using the keys of the coordinates and the names inputted by the computer 301, and transfers the ground object data to the computer 301 through a network 308. When the desired map data does not exist in the map data server 305, access is made to other map data server through a network 307 such as a LAN (Local Area Network) so as to retrieve the necessary map data. Furthermore, the map data server 305 executes route retrieval and attribute retrieval using the map data and a simulation such as evacuation guide. A CG computing server 306 executes processings inherent to computer graphics (CG) such as beam tracking necessary for display the map three-plurality of objects, hidden surface removal, etc, and prepares a scene. At this time, the scene is displayed by solid display.

Figure 4:
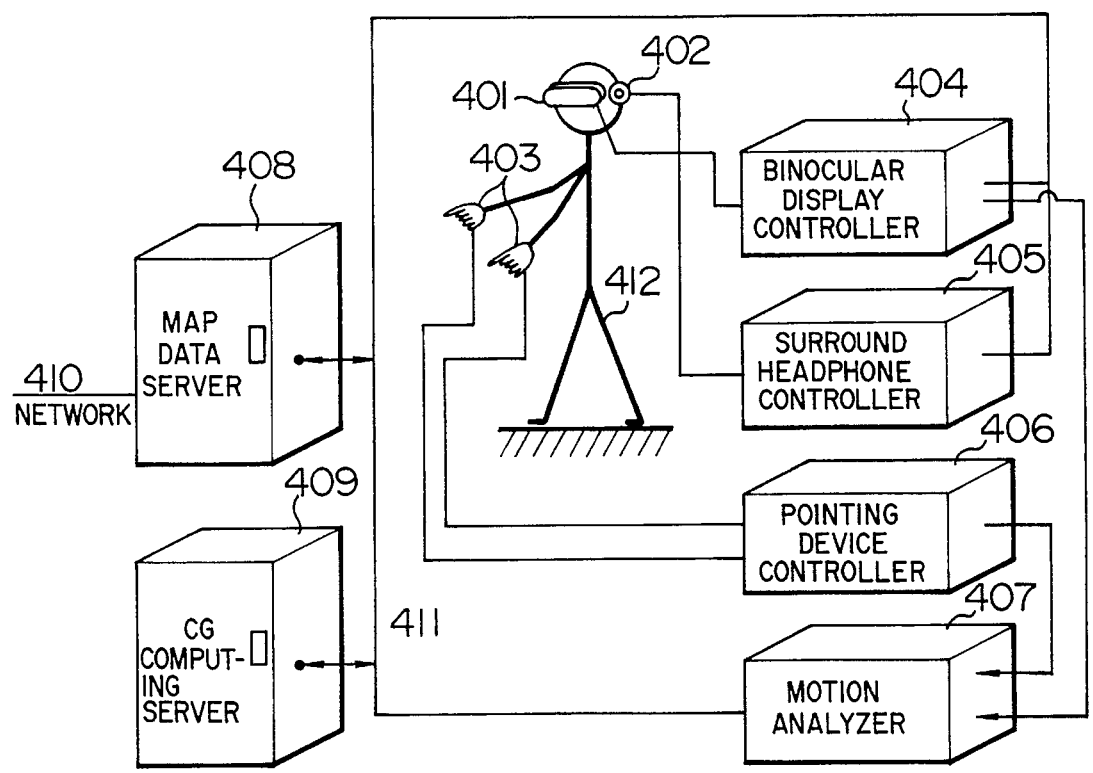
FIG. 4 is a structural view of a virtual experience system by which a system user can experience guidance while entering virtually a scene.

FIG. 4 shows another system construction for accomplishing the first embodiment of the present invention. This system does not use the ordinary display, but enables the user to virtually experience a visual guide. In this visual experience system, the user 412 can feel as if he were in the world generated by computer graphics. A binocular display 401 is a head mount type display comprising sub-displays for the right and left eyes, and detects also the movement of the head by the use of a magnetic sensor. A surround headphone 402 is an acoustic device, and can express the Doppler effect when it is provided with an echo function. A glove type indication device 403 detects the movement of the fingers and the wrists. A map server 408 and a CG computing server 309 have the same functions as those of 305 and 306 in FIG. 3, respectively. Signals of the movement of the head obtained from the binocular display 401 and signals of the fingers and wrist obtained from the glove type indication device 403 are applied to a motion analyzer 407 through a binocular display controller 404 and a pointing device controller 406. Simple background data (base background data) and data (user motion data) reflecting the motion of the user are constructed in the motion analyzer 407, and this analyzer 407 generates the motion by reflecting the signals applied thereto on the user motion data. The data are sent to the CG computing server 409, and sound data are generated, if more real background data and user motion data are necessary. The sound data are sent to the binocular display controller 404 and to the surround headphone controller 405 so that the scene is displayed on the binocular display 401 the user 412 is wearing, and the sound is generated in the surround headphone 402. Reference numeral 411 denotes a network.

Figure 5A:
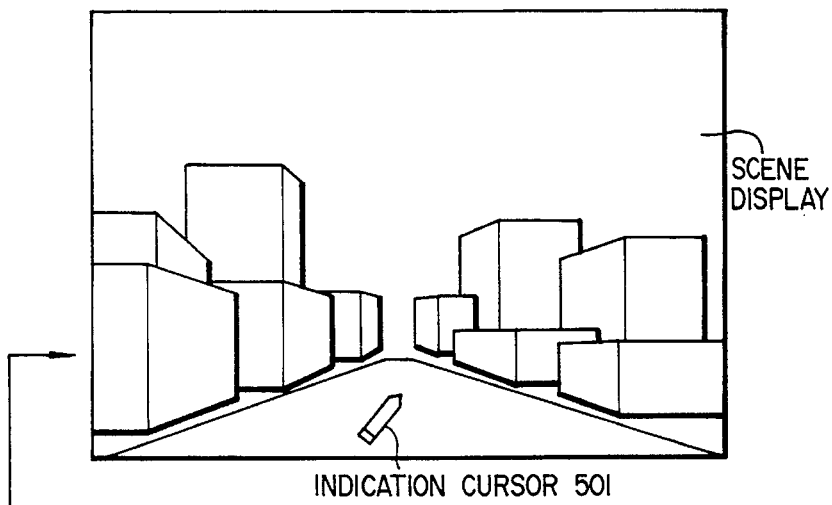
FIGS. 5A, B, C are explanatory views wherein the shift between map data and scene data can be executed smoothly without any malaise by the change of a starting point.
Figure 5B:
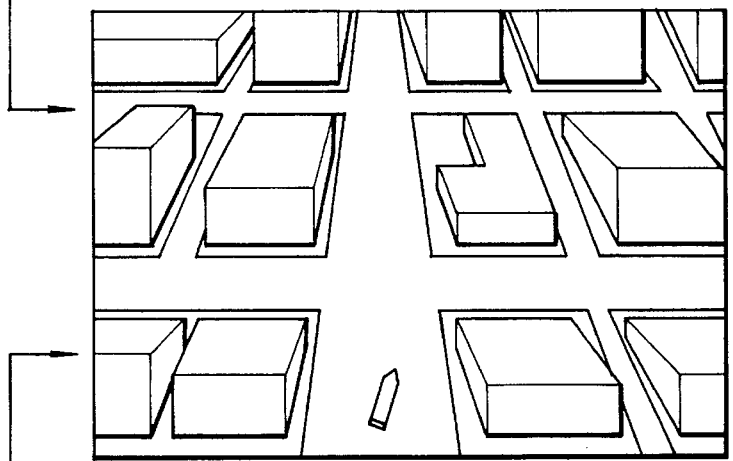
Figure 5C:
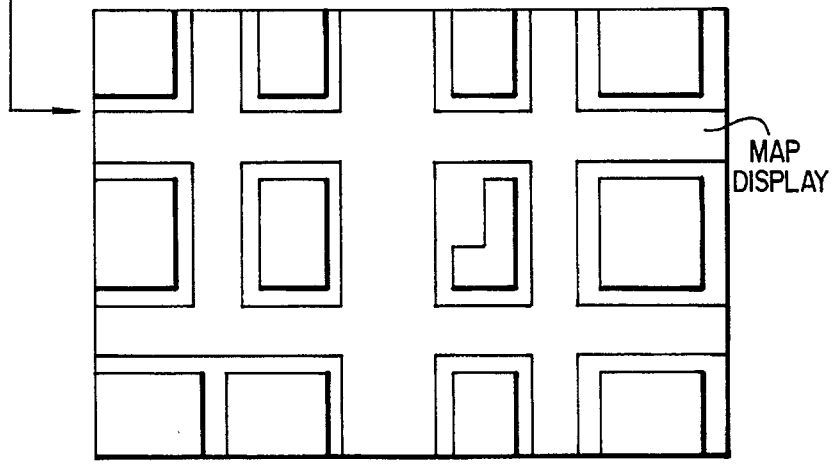

A malaise-free conversion method between the two-dimensional planar map and the three-dimensional cubic map will be explained using the system shown in FIG. 3. FIG. 5 shows an image of the flow of the map display.

It will be assumed hereby that the visual point of the user exists in the horizontal direction relative to the map as shown in FIG. 5(*a*). Display at this time is a scene display. The visual point is moved by operating an indication cursor 501 so that the visual point of the user moves from UP to DOWN. The scene at this time becomes an image in which the side surfaces of the ground objects become smaller as shown in FIG. 5(*b*). When the visual point moves further, the scene is replaced by the map as shown in FIG. 5(*c*). Since conversion of the display modes is effected while the scene and the map are substantially in superposition, the user never loses sight of the target.

Figure 6:
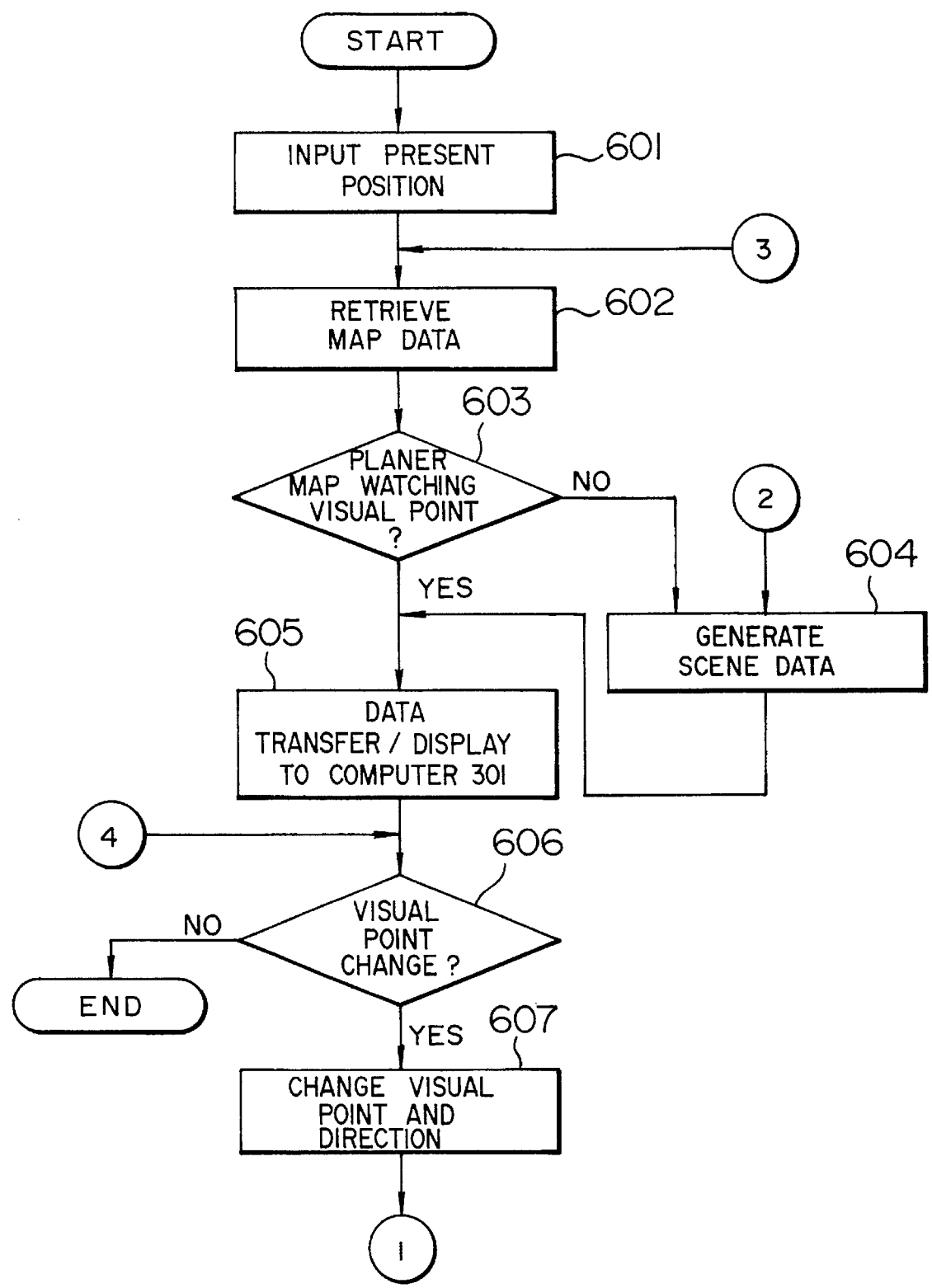
FIG. 6 is a flowchart showing the algorithm for executing the shift between a planar map and a cubic map without a malaise.
Figure 7:
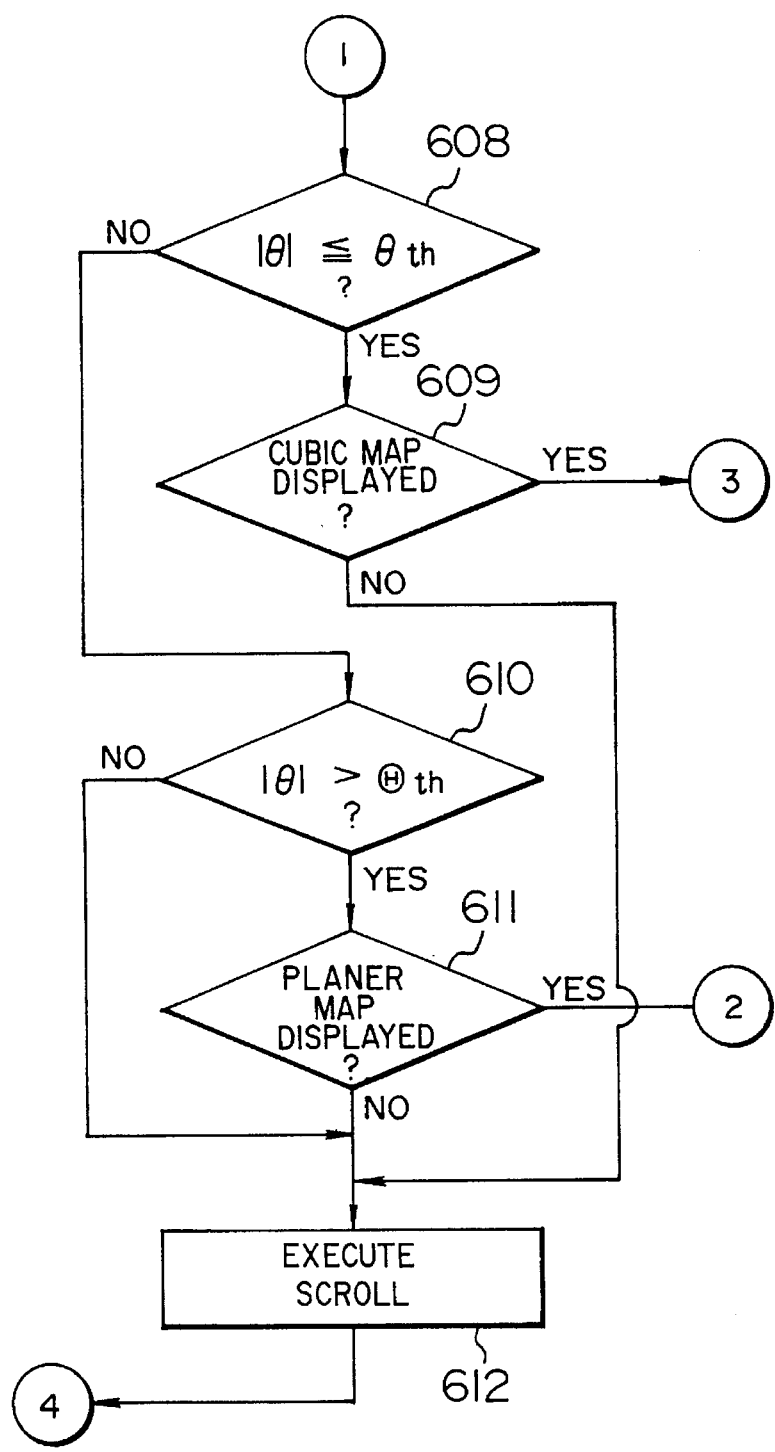
FIG. 7 is a flowchart showing the algorithm for executing the shift between the planar map and the cubic map without a malaise.
Figure 8:
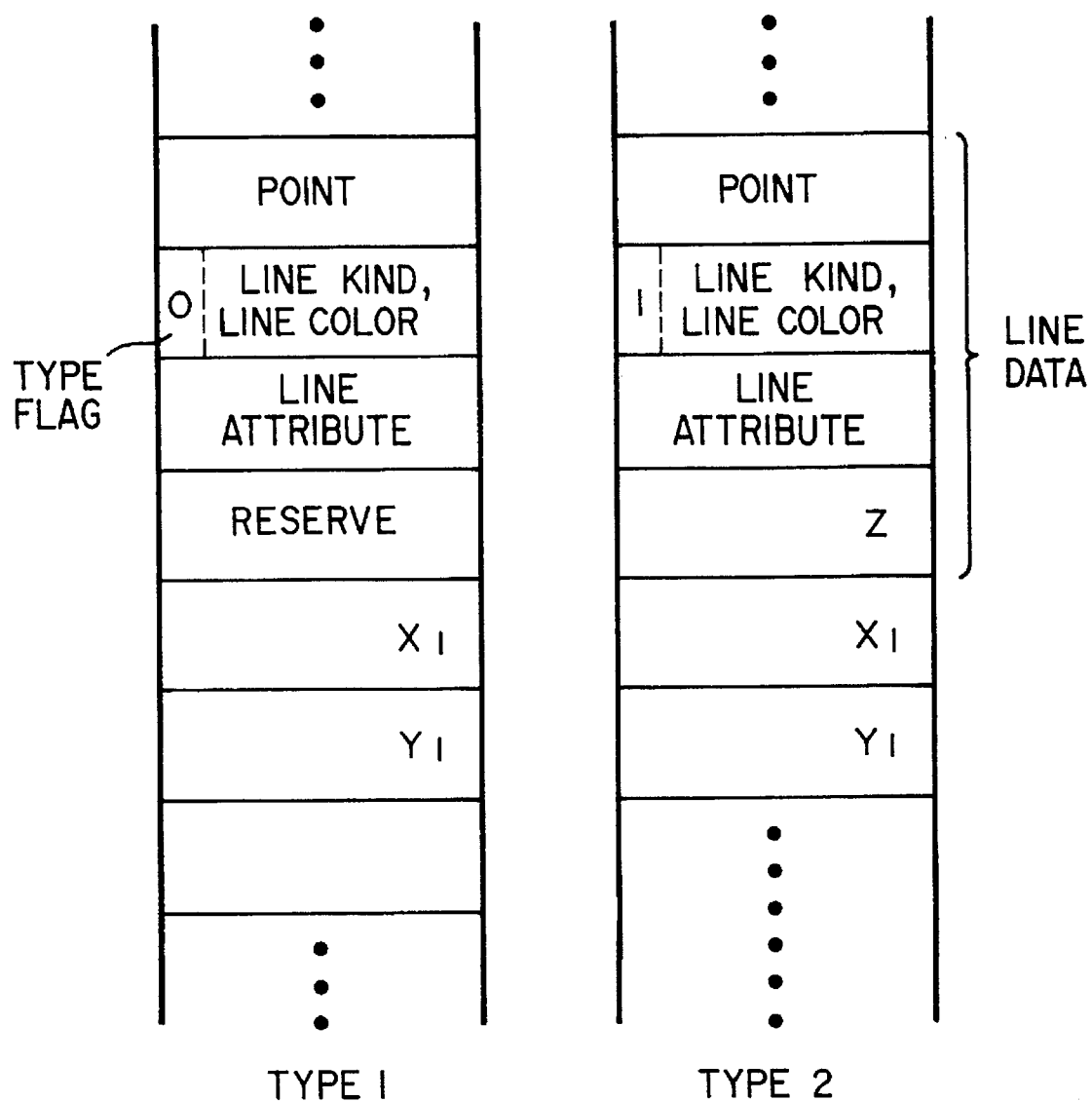
FIG. 8 is a structural view of the map data.

FIGS. 6 and 7 show the conversion algorithm between the planar map and the scene as the cubic map. This algorithm will be explained with reference to the detail of the functions of the system shown in FIGS. 1 and 3. The user inputs the key for retrieving the map (such as the present position) to the computer 301 (step 601 in FIG. 6), and the map data server 305 convertes it to code data (latitude, longitude, etc.) by a key input judgement/encoding unit 101. The map data retrieving unit 105 retrieves the map corresponding to the code data (step 602). This map data is the vector data and has a format such as shown in FIG. 8. This format can be displayed in two types, which can be distinguished by one bit of a type flag. In the type 1, height data (Z coordinates) is added to each point and in the type 2, the Z coordinates are added uniformly to the polygon as a whole which is determined by the rows of the (X, Y) coordinates. The type 1 is suitable for buildings having complicated shapes and the type 2 is suitable for rectangles such as buildings and the contour line. If the visual point lies in the horizontal direction at this time (step 603), the map data retrieved or the map data obtained as a result of simulation calculation in a simulation/calculation unit 107 (to be later described) is transferred by the data transfer unit 108 to the CG computing server 306, and a scene data generation unit 111 generates scene data by computer graphics (step 604). A media selection unit 109 has the function of selecting display means in accordance with the direction of the visual point. As to the direction of the visual point, a direction of default is first set, and a three-dimensional image in this direction is displayed. To generate the scene data, the scene data generation unit 111 effects shading by hidden surface removal and beam tracking. The scene data or the map data thus generated is transferred to the computer 301 and the data display unit 104 controls display (step 605). By the way, the CG computing server 306, too, has the data transfer unit 114. The scene data is projected by the data display unit 104 on the two-dimensional plane determined by the position and direction of the visual point and is displayed on the display 309.

Next, to scroll the scene data, the visual point or the visual direction is changed (step 606). The position of the visual point and its direction are encoded by the key input judgement unit 102 for the indication cursor or by the scroll key input judgement unit 103. There are two scrolling methods. The first is scroll of the scene and the other is scroll of the planar map. It will be assumed hereby that the visual point is changed in the horizontal direction when the map is watched by the scene (step 607). When the angle $\theta$ between the visual direction and the perpendicular is within a designated range $|\theta| \leq \theta th$ (step 608 in FIG. 7), the media selection unit 109 judges that the display must be made by the use of the map data, and transfers the map data, while the map display unit 104 effects display control (step 609). At this time, $\theta th$ need not always be 0. When $|\theta| \neq 0$, the visual point and the visual direction can be aligned with the image existing in the visual field of the user by effecting trapezoidal correction of the map data and displaying it. Next, it will be assumed that the visual direction is changed from the perpendicular direction to the horizontal direction. When the relation $|\theta| > \theta th$ within the designated range of the visual point at this time (step 610), the media selection unit 109 judges that the display must be made using the scene data, and converts the map data to the scene data (steps 611, 614). Visual point change scroll with the change of the visual point is then executed using the resulting data (step 612). By the way, the function of each of the data display method judgement unit 110, interference check unit 112 and window generation unit 113 will be explained later.

In this way, the shift between the planar map and the cubic map can be carried out smoothly without any malaise. When the display is drastically changed between the scene display by the visual point in the horizontal direction and the map by the visual point in the perpendicular direction, the user is likely to lose sight of the present position and the target, but the system of this embodiment can avoid such a disadvantage. An output desired by the user can be obtained even when a print output is obtained.

Next, the guide method using the display data will be explained. One of the important contents in guidance is retrieval and display of the detailed data of the ground objects. Two modes of guidance are available. One is a method which is carried out subjectively by the user and the other is a method which is executed autonomously by the system. To begin with, the method which is carried out while the user is watching the scene will be explained. In other words, the user effects scroll and retrieval and display of the detailed data while watching the scene displayed three-dimensionally. Scroll is carried out by inputting the following seven keys.

1: advance 2: retreat 3: UP movement

4: DOWN movement 5: $\theta$ (Eulerian angle)

6: $\phi$ (Eulerian angle) 7: $\phi$ (Eulerian angle)

Figure 9:
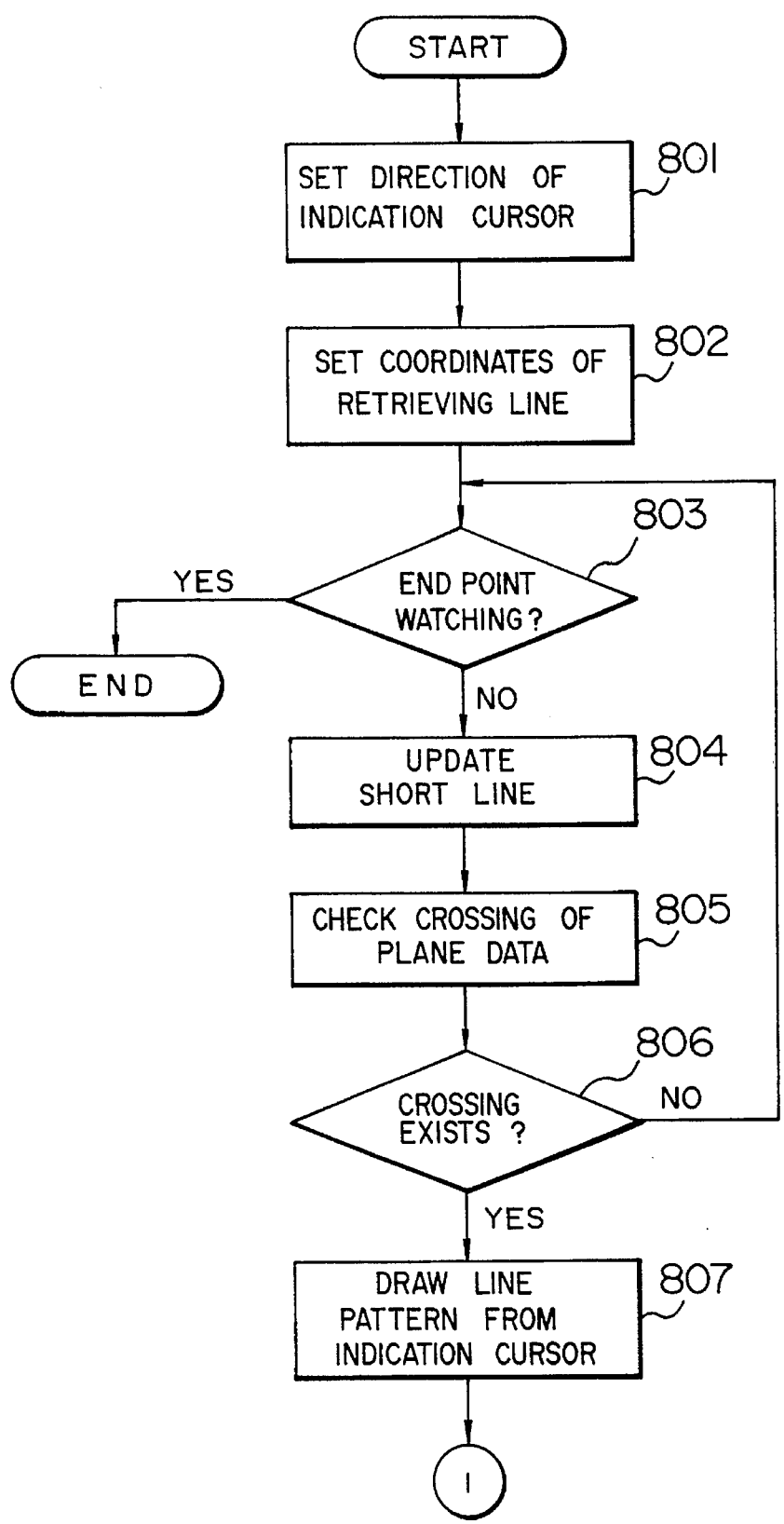
FIG. 9 is a flowchart showing the algorithm for displaying attribute information added to ground object data in the scene.
Figure 10:
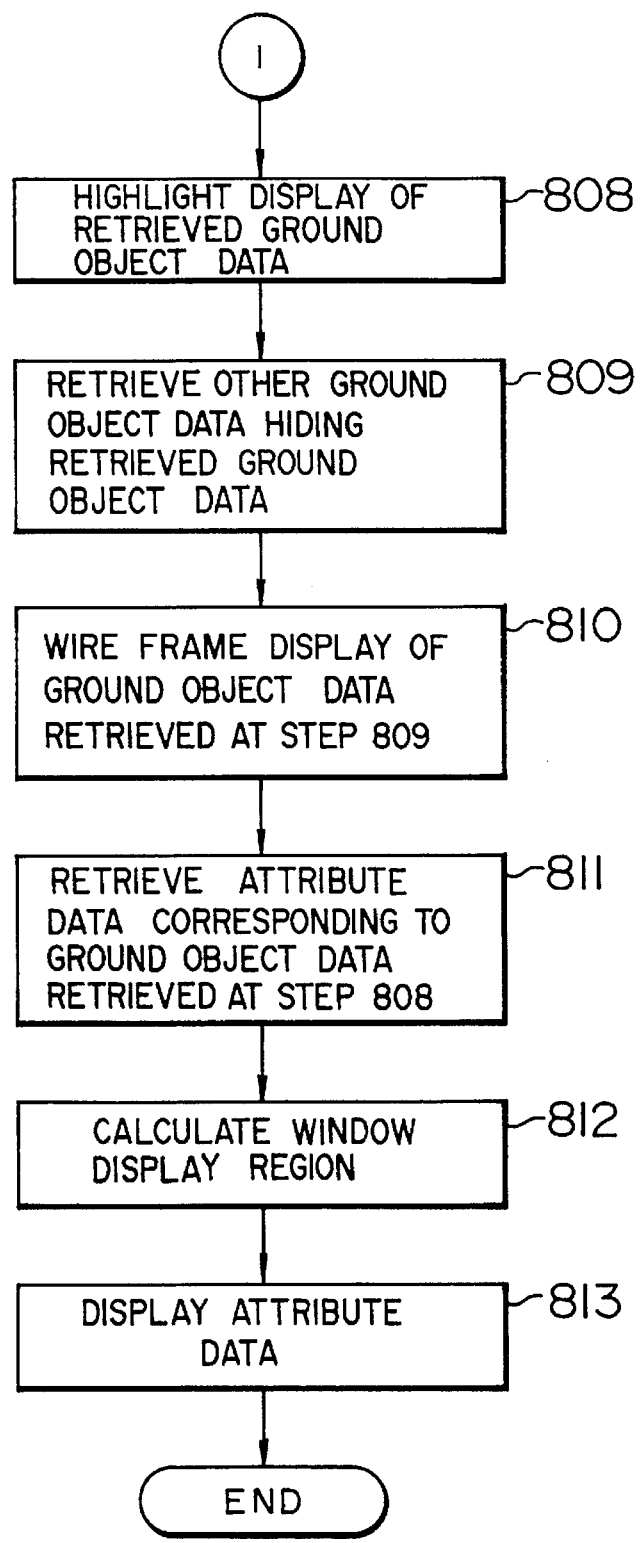
FIG. 10 is a flowchart showing the algorithm for displaying attribute information added to ground object data in the scene.

To designate the ground object having the detailed data, the indication cursor 501 such as one shown in FIG. 5(*a*) is displayed. It is necessary at this time that the cursor be shaped in such a manner as to have the retrieving direction easily understood. While scroll is being made, the ground object is designated to retrieve the attributes as its detailed data. FIGS. 9 and 10 show the attribute retrieval display algorithm.

Figure 11:
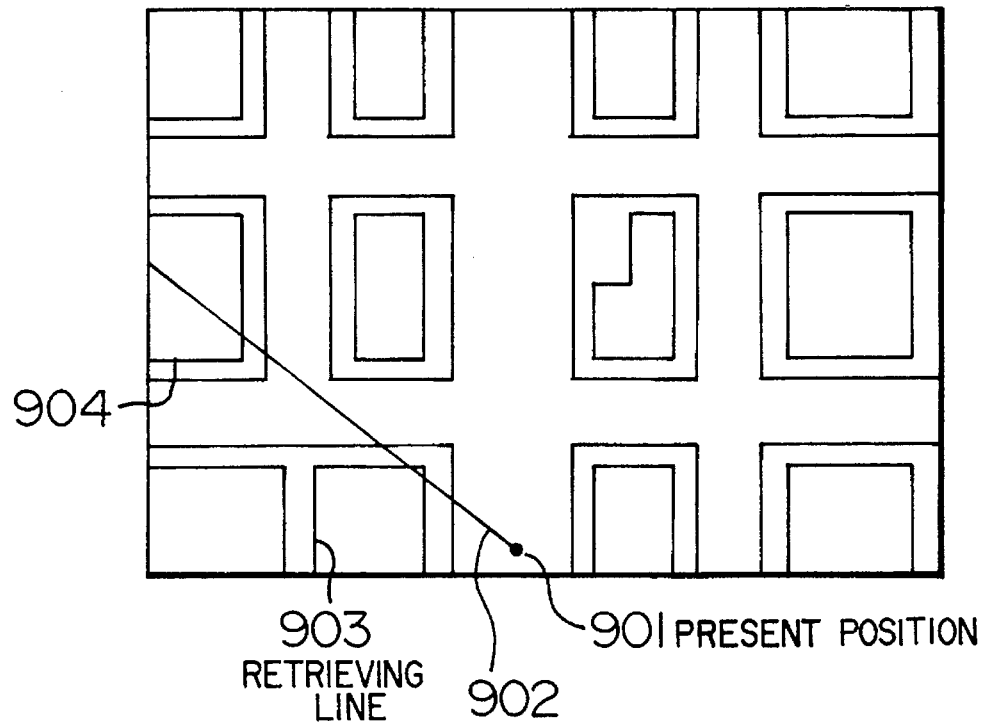
FIG. 11 is an explanatory view useful for explaining a retrieval system of ground object data by beam shot pointing.
Figure 12:
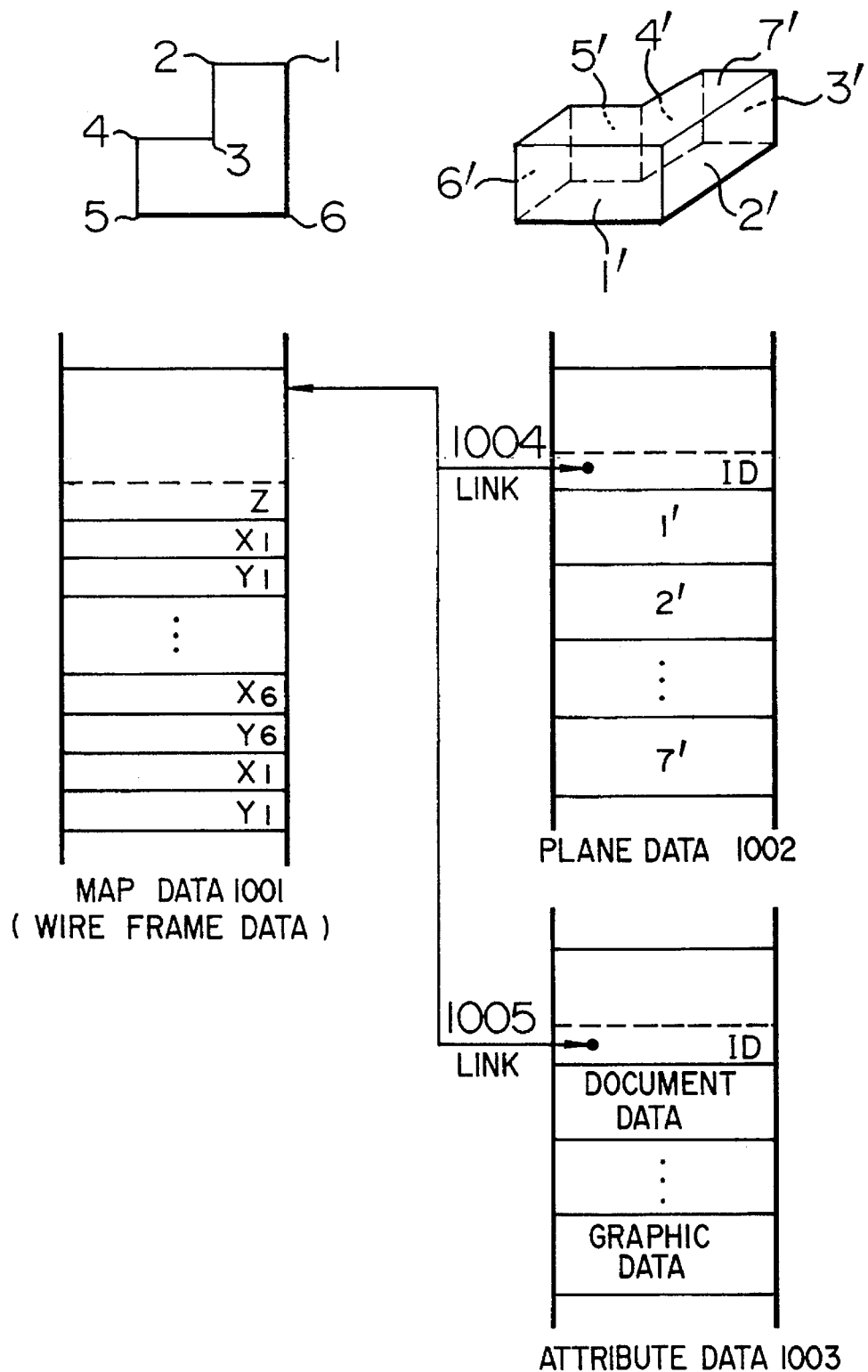
FIG. 12 is a management system diagram of scene and attribute data.

First of all, the direction of the indication cursor is so set as to select the ground object (step 801). Though the ground object data can be obtained by a Z buffer method in computer graphics, it can also be detected by the map data as the basic data for scene display. Hence, this method will be explained. A retrieving line extending from the cursor position 901 to a position 902 shown in FIG. 11 is set to the direction of the indication cursor (step 802). While this retrieving line is segmented into small segments from the starting point (step 804), the ground object data crossing the line is retrieved. In this case, retrieval can be made easily if the data has a data structure which divides the data into wire frame data 1001 of the ground object (which means the graphic data shown in FIG. 5), plane data 1002 and attribute data 1003 and manages them, as shown in FIG. 12.

First, crossing with the retrieving line 902 is checked using the (X, Y) coordinates in the wire frame data. The plane data of the crossing ground object data is then retrieved by tracing the link 1004. This link tracing operation corresponds to the search of the ID data common to the wire frame data 1001 and to the plane data 1002 (see FIG. 12). Crossing of the retrieving line, to which the height is added, with the plane is checked (step 805). If any crossing point exists (step 806), the coordinates (X, Y, Z) value of that point is determined, and a line pattern from the tip of an indication rod to the cross point is drawn in the display so as to represent that the ground object is selected (step 807). This can be obtained easily because the four coordinates of the plane and the two coordinates of the line are known. In FIG. 11, the ground object data 903 and 904 are the object of check as the applicants of crossing. A change of a color or a highlight display is employed to stress the selected ground object (step 808). Hereinafter, such a pointing method of the ground object will be referred to as "beam shot pointing". The pointing method is particularly effective in a virtual reality system. For, the indication cursor is moved in match with the movement of the wrist or fingers without using the interface such as the keyboard or the mouse in this system.

Figure 13:
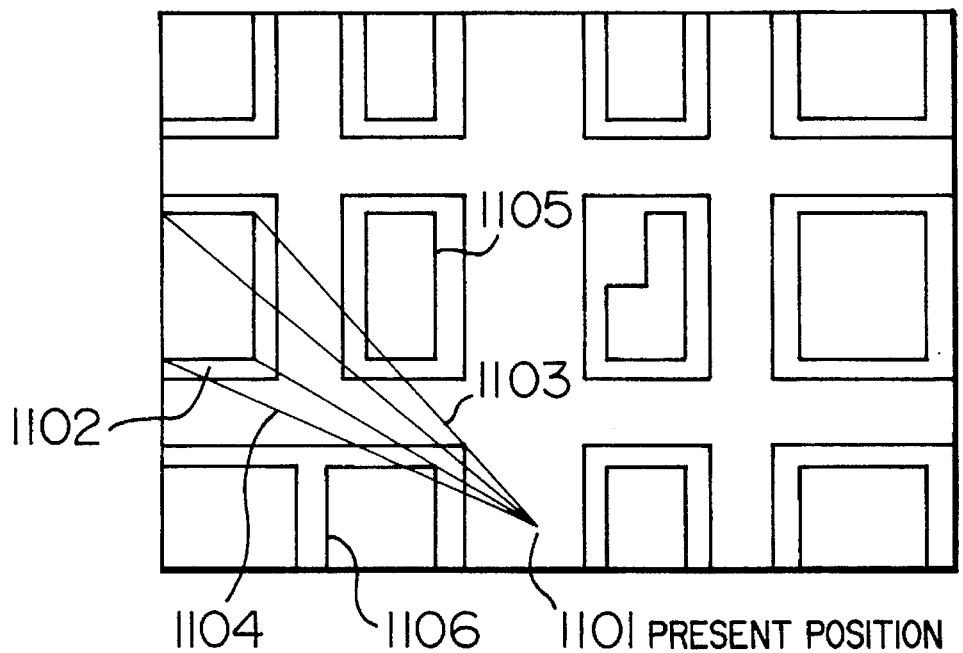
FIG. 13 is an explanatory view useful for a system for retrieving other ground object data hiding the retrieved ground object data.

There is a high possibility that considerable portions of the ground object data retrieved by beam shot pointing are concealed by other ground object data. Therefore, the display of the ground objects as the cause of this concealment is changed from solid display to wire frame display. The selection of the ground object data as the object of the wire frame display, too, can be made by the use of the map data. This method is shown in FIG. 13. It will be assumed hereby that the ground object data 904 is retrieved in FIG. 11.

A line is drawn from a characterizing point that constitutes the indication cursor position 1101 and the retrieved ground object 1102, to the cursor position 1101, and figures existing inside the region encompassed by two outermost lines 1103, 1104 are retrieved (step 809), and display is made while erasing the plane data of other ground objects and leaving only the wire frame (step 810). Since the ground objects 1105 and 1106 correspond to the figures in FIG. 13, the display is changed to the wire frame display. To effect such a data display at a high speed, the display can be accomplished by applying different display attributes to the wire frame data 1001 and to the data of the plane 1002 and erasing only the plane data. In this way, the ground object data retrieved by beam shot become easier to watch. This display is executed by the data display method judgement unit 110.

Next, the attribute data added to the ground object data are retrieved and are displayed on the display. The retrieving sequence of the attribute data is as follows. First, the attribute data 1003 are retrieved by tracing the link 1005 for the ground object data retrieved by beam shot pointing (step 811). The following two methods can be used. One is a method which displays a window of a plane by rectangles and the other is a method which displays a cubic window by rectangular parallelepipeds. Such windows are displayed in the displayed world. The two-dimensional rectangular window is used for displaying the document data, the two-dimensional graphic data and the image data. The window of the three-dimensional rectangular parallelepipeds is used for displaying the three-dimensional figures. The window is displayed in such a manner as not to completely conceal the selected object. How this region is calculated is as follows. Now, (X, Y, Z) of the pointed ground object data are passed through a perspective view conversion formula and are converted to the (X, Y) coordinates on the display. A circumscribed rectangle to this ground object is calculated from this (X, Y) data. Horizontal and vertical lines passing the sides of this circumscribed rectangle are considered to divide the display region. If the sides of the circumscribed rectangle do not overlap with the boundary of the display region, the maximum display screen is divided into nine segments. If one of the sides of the rectangle overlaps, the number of segments is 6 and if two sides overlap, the number of segments in 4. If three sides overlap, the number of segments is 2. In which of the divided regions the window be displayed is decided by the following steps:

Step 1: The sizes of the eight segment regions and the size of the window are compared, and when the attribute display window can be stored in any of the regions, one of the regions is selected.

Step 2: The sizes of the 1×2 regions from the upper left are compared sequentially with the window, and when the attribute window can be stored in any of them, the greatest region among them is selected.

Step 3: The sizes of the 2×1 regions from the upper left are compared sequentially with the window, and when the attribute window can be stored in any of them, the greatest region among them is selected.

Step 4: The sizes of the 2×2 regions from the upper left are compared sequentially with the window, and when the attribute window can be stored in any of them, the greatest region among them is selected.

Step 5: The sizes of the 2×3 regions from the upper left are compared sequentially with the window, and when the attribute can be stored in any of them, the greatest region among them is selected.

Step 6: The sizes of the 3×2 regions from the upper left are compared sequentially with the window, and when the attribute window can be stored in any of them, the greatest region among them is selected.

In this way, the greatest region for displaying the attribute is retrieved (step 812).

Figure 14A:
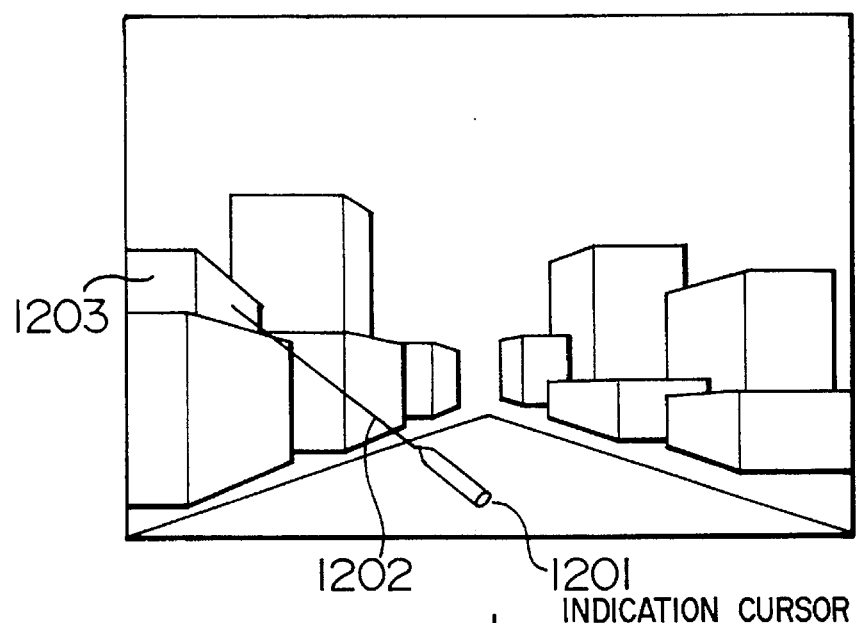
FIGS. 14A, B are explanatory views showing the display of attribute information by a definite screen image.
Figure 14B:
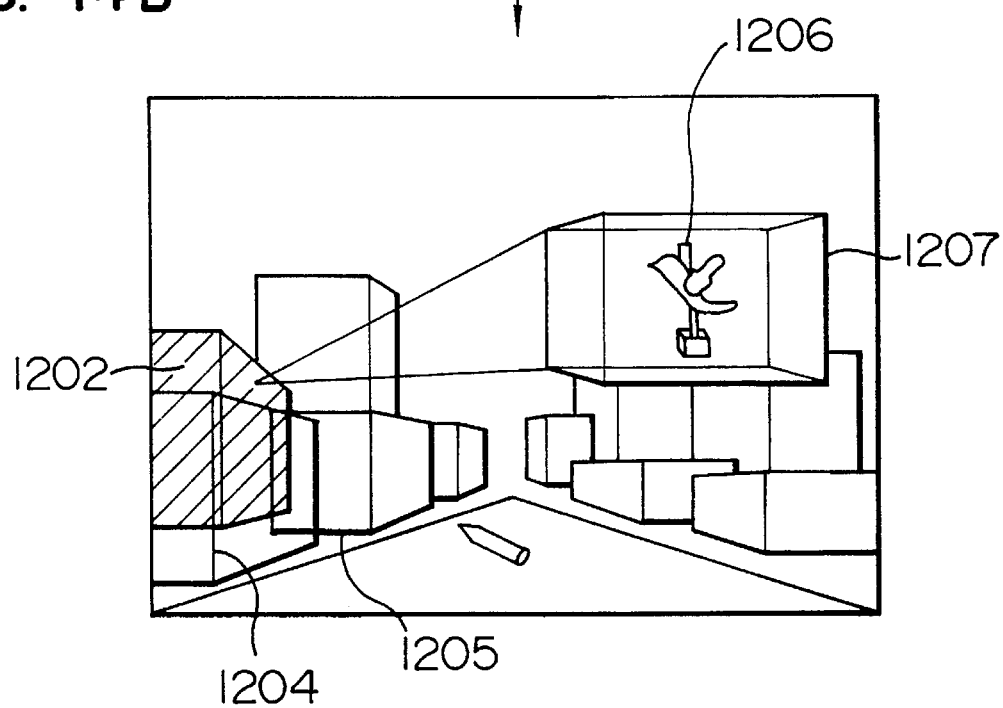

Calculation is made in the same way for the three-dimensional window, and a circumscribed rectangle having the window shape obtained by perspective conversion is calculated. Access to this three-dimensional window is allowed preferentially. This can be accomplished by disposing a flag representative of access priority to the scene data (wire frame data 1001 and the plane data 1002) as the background, in the attribute data 1003. When the three-dimensional window is displayed, the interference check with the background is made so as to preferentially display the window. This operation is executed by the interference check unit 112 and the window display unit 113 shown in FIG. 1. If the system shown in FIG. 4 is used, the signals of the head and wrist of the user can be interlocked with the movement of the indication cursor. Therefore, the indication cursor in the display screen can be moved in accordance with the motion of the hand. Access can be made to the figure inside the three-dimensional window. After the window is displayed in this way, the attribute data is displayed (step 813). FIG. 14 shows the image which makes practically the guide. In FIG. 14(*a*), the building 1203 is indicated by the line pattern 1202 by beam shot pointing from the indication cursor 1201. In FIG. 14(*b*), the display attribute of the building 1203 is changed, and the buildings 1204 and 1205 concealing the building 1203 are displayed in the wire frame. The three-dimensional graphic data (a monument in the building 1203 is hereby displayed) as the attribute data is displayed in the three-dimensional window 1207. Here, it is possible to display altogether a plurality of windows in one display screen. At this time, the Steps 1 to 6 described above are continued twice, and the region selected once is deleted from the object of the second selection. (Incidentally, the display of the three-dimensional window 1207 in FIG. 14 is effected by the window generation unit 113 shown in FIG. 1, and this point will be described in further detail in the second embodiment of the present invention.)

When the scene data is scrolled, it becomes possible not only to change the user's visual point and the scene but also to prevent pass through of the data by effecting the interference check at the time of the solid display. Naturally, pass through of any ground objects subjected to the solid display can be made always without effecting the interference check, but the user often cannot known whereabout of his own after such pass through. Accordingly, the ground object which is desired to be broken through is retrieved by beam shot pointing which has displayed it previously, and the plane data is erased while leaving only the wire frame data of the display while keeping it displayed. In this way, the data which is subjected to the wire frame management can pass through the plane, but the data subjected to the solid display can no longer pass through the plane due to the interference check. Accordingly, the system becomes a system which is more realistic and easier to operate. More definitely, the interference check is effected only for the plane data 902.

Next, the guide method which the system autonomously effects will be explained. At this time, the present position of the user, the destination and the relay point are designated. Route retrieval is made using the road map data. This can be determined by a Dijkstra's minimum length pass searching method, a heep method, an A star method, and so forth. When a route is determined, a tag data representing the generation of the shape of the indication cursor is added to another road crossing the route. The same shape as that of the indication cursor is displayed when the tag position is contained inside the range of the scene display. This indication cursor cannot move until it is pointed. The actual cursor moves along the route first determined, and when it approaches to the ground object to which the attribute data is added, that ground object is selected by beam shot pointing and the attribute is retrieved and displayed. The timing of pointing is such that when the present position, that is, the position of the indication cursor moving in practice, is (X, Y), the ground object data having the coordinates inside a specific distance from the cursor position as the characterizing point of the figure is selected.

Figure 15A:
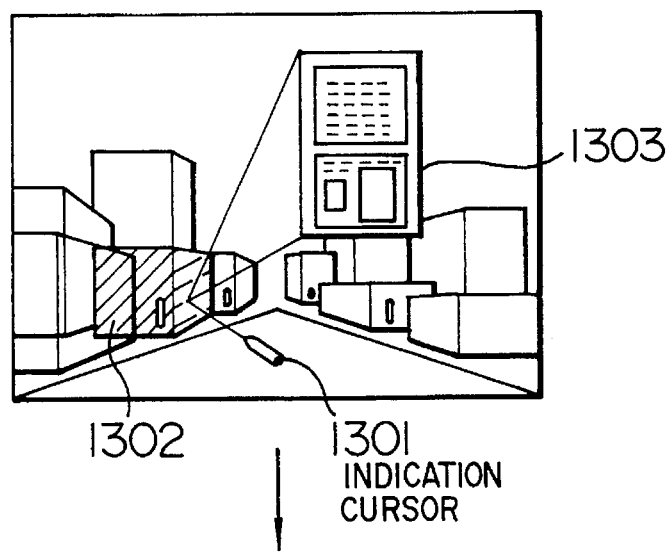
FIGS. 15A, B, C are explanatory views showing that the system effects guidance by an autonomous operation, through a screen image.
Figure 15B:
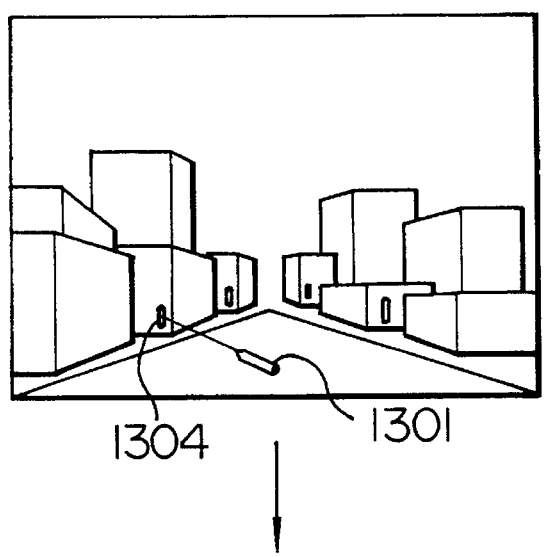
Figure 15C:
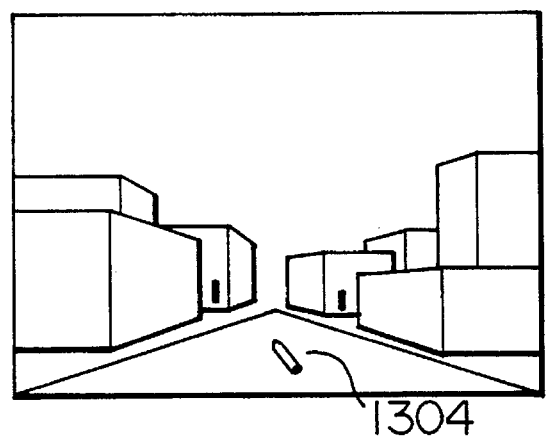

In other words, the operation described above is carried out in the following way. When even one of the coordinates (Xi, Yi) of the characterizing point of the ground object data satisfies the following relation, $$\sqrt{(|X - Xi|^2 + |Y - Yi|^2)} < r \qquad (1\text{-}1)$$

the interference check is effected by assuming that the ground object is selected, and a line pattern is generated so as to extend from the present position (X, Y) of the indication cursor to the coordinates (X, Y) of the crosspoint. Then, the attribute data is displayed in accordance with the algorithms shown in FIGS. 9 and 10. Next, when the shape of the indication cursor appears, the indication cursor data is beam-shot-pointed, so that the indication cursor that has been moving so far is erased and the indication cursor figure selected afresh is used as a new indication cursor. the guide by the autonomous processing is resumed using this indication cursor. A new destination and relay points that have not yet been passed are again retrieved from the indication cursor selected at this time. To prevent the route retrieved at first from being selected again, recalculation of the route is made while the road data is blocked in such a manner that the road corresponding to the partial line portion extending from the indication cursor data to the bent portion, for the route that is determined immediately before. In this way, the same route obtained immediately before can be prevented from being selected again. At this time, it is possible to insert a new relay point. FIG. 15 shows a guide image by such an autonomous operation. In FIG. 15(*a*), the ground object data 1302 is selected by beam shot pointing by the indication cursor 1301 and its attribute data 1303 is displayed in the window. In FIG. 15(*b*), another indication cursor FIG. 1304 is shown selected by beam shot pointing by the indication cursor 1301. FIG. 15(*c*) shows the change of the guide route by the selection of the new indication cursor.

Such a visual guide system can be utilized when installed in a department store, a tourist office, a police station, and so forth. Particularly when installed in the police station, the system can execute a road guide, etc, which cannot be easily explained orally.

Furthermore, this system can be used for other applications. For example, the system is normally used for the road guidance but in case of emergency such as earthquakes or fires, the system can be utilized as an emergency evacuation system. This utilization is carried out in the following way.

Figure 16:
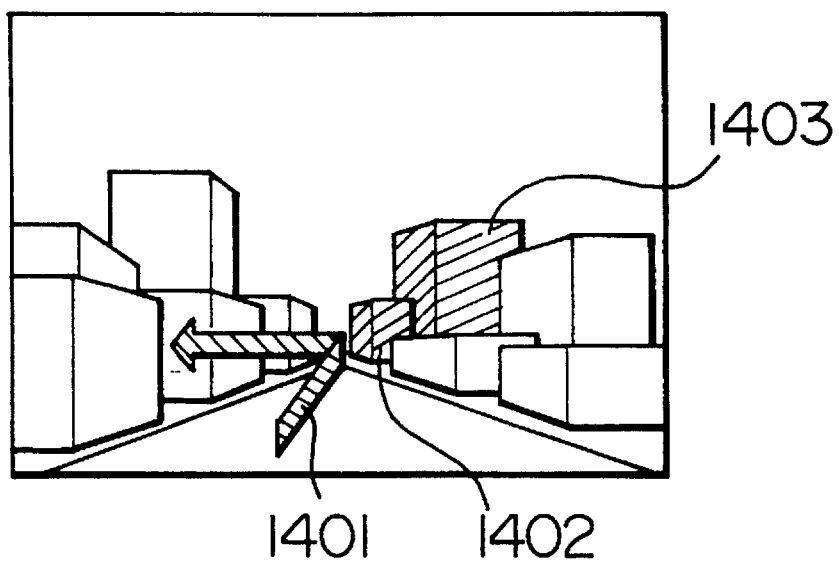
FIG. 16 is an explanatory view showing a screen image when the visual guide system is used for evacuation guidance in case of emergency.
Figure 18:
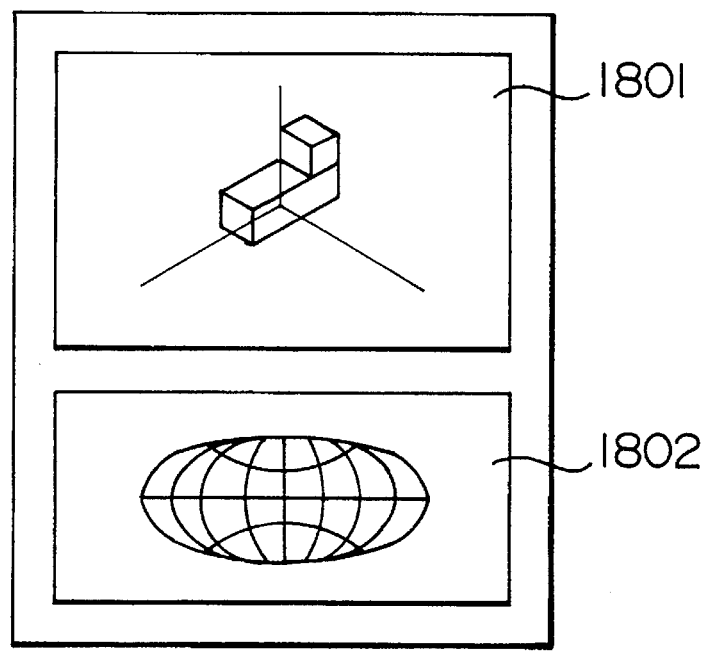
FIG. 18 is an explanatory view showing an example of a window display method according to the prior art.
Figure 19:
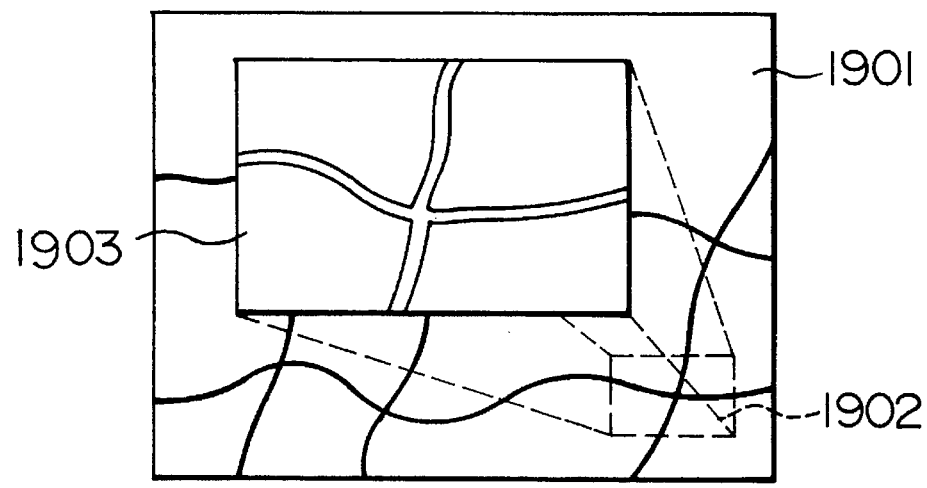
FIG. 19 is an explanatory view showing a window display method according to the prior art.

First of all, the route to the evacuation place from the installation site of the present system is retrieved. The simulation calculation unit 107 shown in FIG. 1 effects disaster simulation. The disaster simulation includes the spread of the fire, the flood and the earthquake. Disaster measurement data inputted through the network are used as the initial values of disaster simulation. The initial values are inputted incessantly on the real time basis. However, since some of simulations needs a long time, the initial value data are corrected whenever one simulation is completed. It is of importance here that simulation and the display of the evacuation routes be carried out in an easily comprehensible way to people. First, the color of the ground objects existing in the direction of the disaster stricken area inside the scene is changed in order to represent the disaster stricken area. However, people during evacuation are not practically believed to be calm and composed enough to distinguish the colors. Therefore, they are not believed to be capable of knowing the magnitude and direction of the disaster by the difference of colors. FIG. 16 shows an image of the actual evacuation guidance road display. An arrow 1401 represents the direction of evacuation. Since the ground object data 1402 and 1403 exist in the direction of the disaster, they are highlighted.

The functions of the visual guide system described above can be used dividedly for the use at the normal time and the use in case of emergency. Since the system has the more friendly interface, it can be operated irrespective of the age of the users.

In accordance with the system of the first embodiment of the present invention, the user can freely obtain the data between the planar map data and the cubic scene data. Therefore, the user can utilize the system and output the result by utilizing the comprehensible media. The two- and three-dimensional windows can display the attributes in the easily comprehensible format without the malaise. Both the attribute data and the ground object data linked with the former are easy to comprehend so that when the attribute data is displayed, the ground object data is not concealed as much as possible. Furthermore, since another ground object data concealing the ground object data to be highlighted is switched to the wire frame display, highlighting becomes more effective. The visual point can freely move in the scene without losing the target by displaying the ground object which is desired to pass through by the wire frame display.

The user can intervene interactively and can change the guide route even when the system executes the guidance by its own autonomous operation. Furthermore, this system is used normally for tourist guide, road guidance at the police box, etc, but can be used as the evacuation guidance road display system in case of emergency such as disasters. Therefore, the system can be utilized as the multi-purpose system.

Next, the second embodiment of the present invention will be explained with reference to FIGS. 17 to 28. Though the first embodiment is mainly directed to the visual guidance system, the second embodiment represents a graphic data processing system and various other applications using the three-dimensional window (FIGS. 14; 1207) in the first embodiment.

Figure 20:
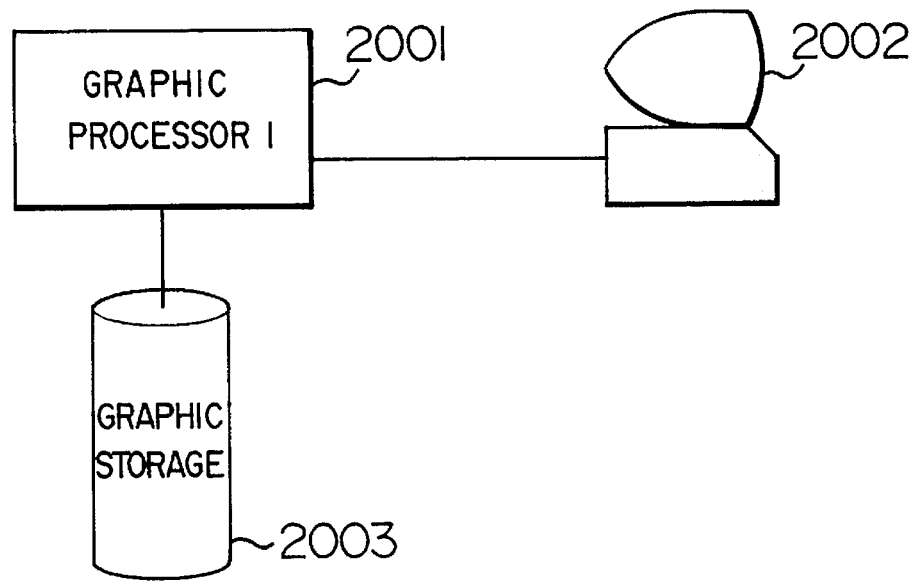
FIG. 20 is a structural view showing an example of a graphic data processing system.
Figure 21:
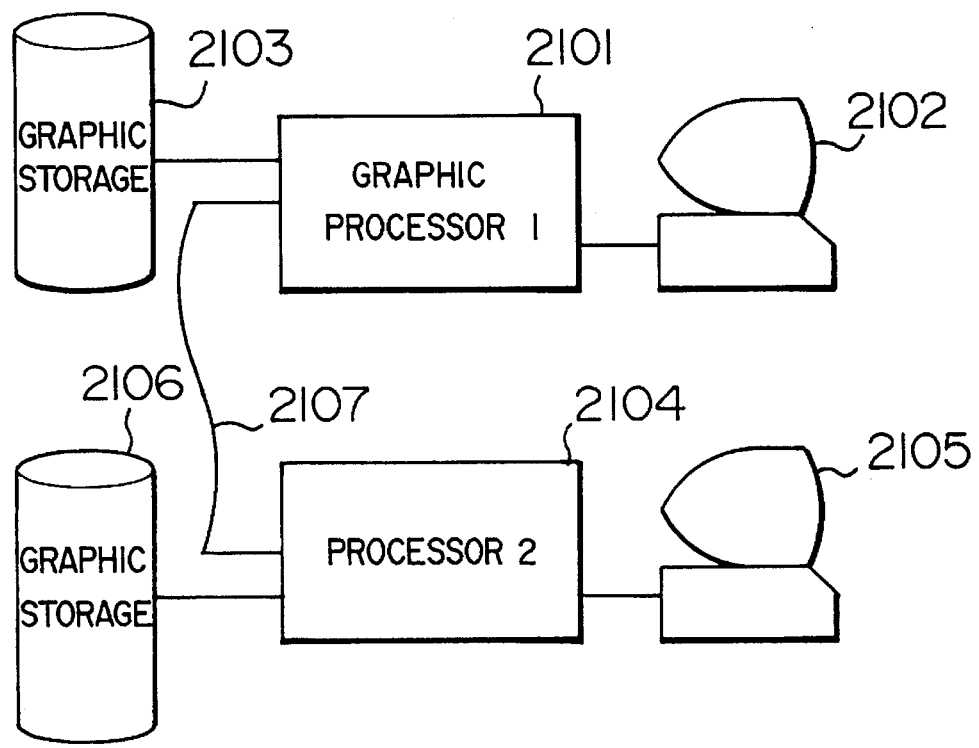
FIG. 21 is a structural view showing another example of a graphic data processing system.

FIGS. 20 and 21 show a system configuration for displaying the three-dimensional window (hereinafter called the "3D window") as the second embodiment of the present invention. In FIG. 20, a graphic processor 2001 executes various manipulations such as the generation of the 3D window, and perspective conversion, hidden surface removal, and so forth. The graphic data and the 3D window are displayed on a display 2002. A graphic storage 2003 stores the graphic data.

In FIG. 21, the system shown in FIG. 20 is shown connected to a communication network 2107. In such a system, the generation of the 3D window and the manipulation of the graphic data can be made by another graphic processor connected to the network. For example, instead of displaying the 3D window and the graphic data generated by the graphic processors 2, 2104 on the displays 2, 2105, they can be transferred to, and displayed on, the display 2102 through the communication network 2107 and the graphic processors 1, 2101. Graphic storages 2103, 2106 store the graphic data. The data generated by the graphic processors 1, 2101, 2, 2104 can also be stored in the graphic storages 1, 2103, 2, 2106. The graphic storages 1, 2103 can be removed and all the data can be stored in the graphic storages 2, 2106.

Figure 22:
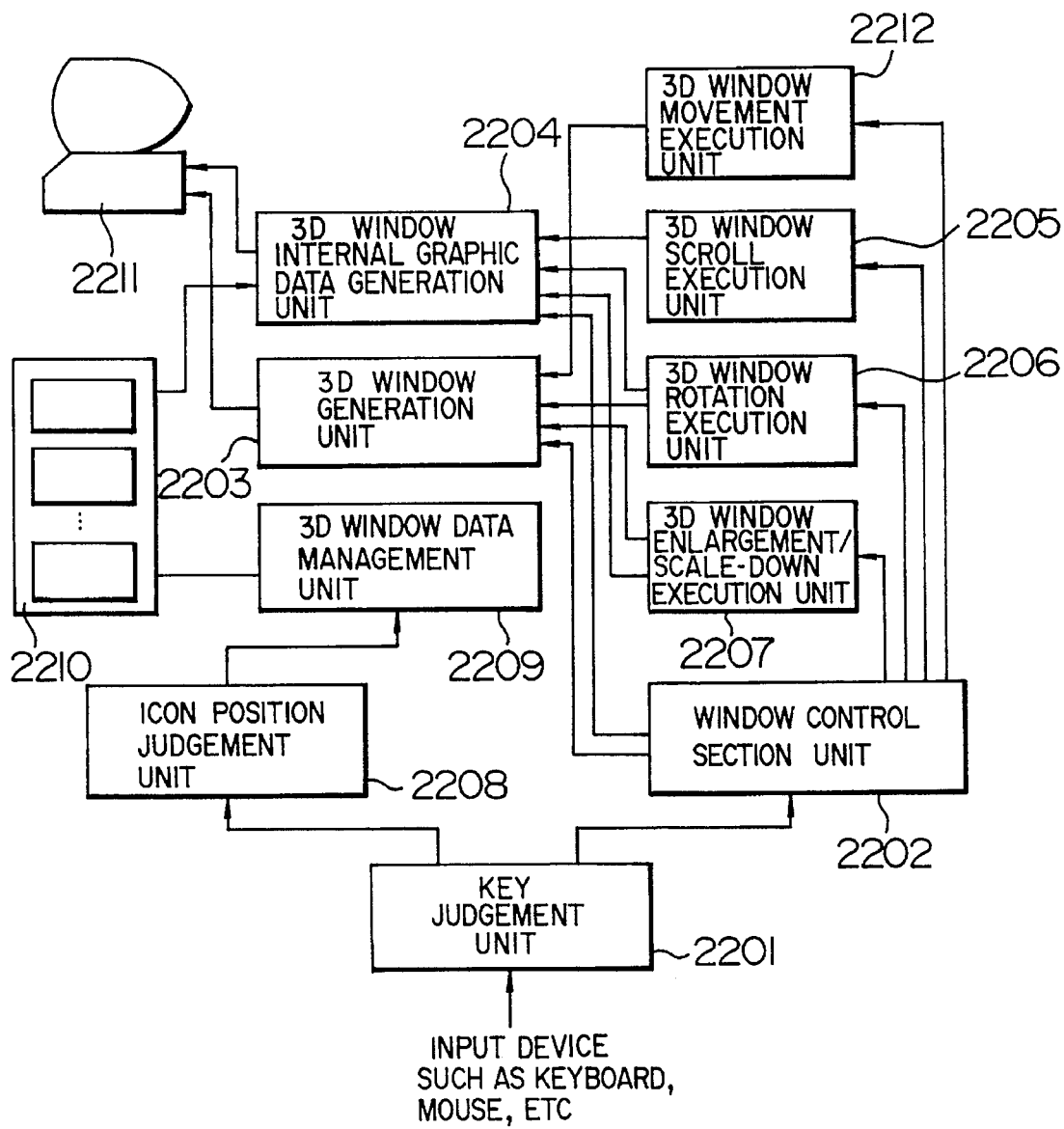
FIG. 22 is a structural view showing three-dimensional window functions.

FIG. 22 shows a functional construction for displaying the 3D window in the graphic processors 2002, 2101, 2104 shown in FIGS. 20 and 21. The content of the key (key code) and the position coordinate data inputted by the input device such as the keyboard or the mouse are sent to the key judgement unit 2201, which judges whether a specific 3D window is to be selected from among a plurality of 3D windows the user has already displayed, or the data is inputted for the window operation such as the generation of the 3D window, the change of the 3D window, etc.

It will be assumed that the data is inputted from the keyboard or the mouse for operating the 3D window. At this time, a 3D window control selection unit (selector) 2202 judges the kind of the operations for the 3D window. The contents of the 3D window operation include 3D window display (3D window movement execution unit 2212), scroll of the graphic data inside the 3D window (3D window scroll execution unit 2205), and rotation/enlargement/scale-down (3D window rotation execution unit 2206, 3D window enlargement/scale-down execution unit 2207), and the operations are carried out by the respective execution units.

Figure 23:
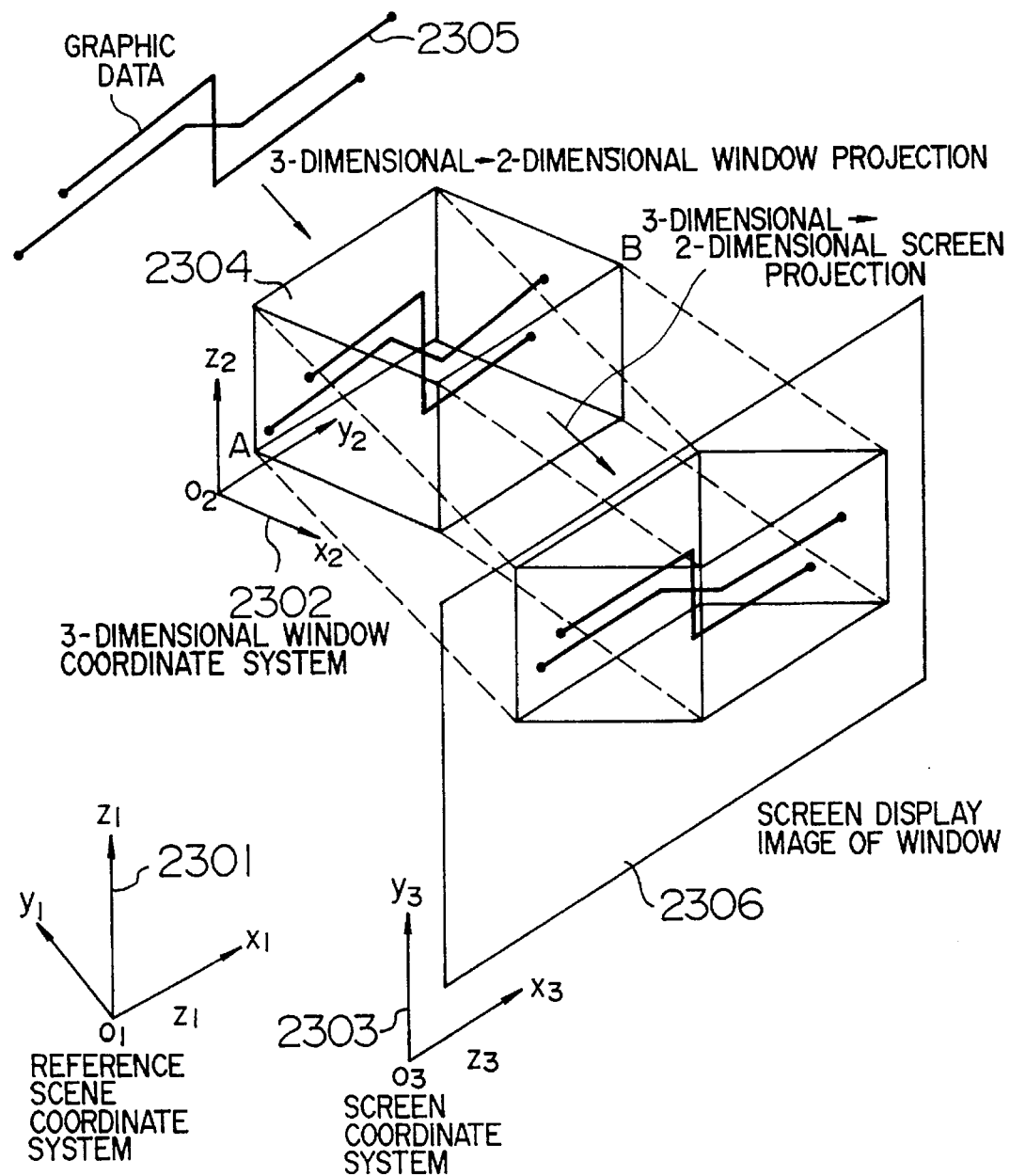
FIG. 23 is an explanatory view showing the relation of three coordinate systems necessary for the three-dimensional window and graphic data.

FIG. 23 shows the relation between the coordinate system associated with the display (reference scene coordinate system $Z_1$ 2301, screen coordinate system $Z_3$ 2307) and the coordinate system defined inside the 3D window (window coordinate system $Z_2$ 2302). A method of displaying the 3D window will be explained with reference to FIGS. 22 and 23. First, the data for generating the 3D window is sent to the 3D window generation unit 2203. The kind of the operations of this 3D window generation unit 2203 is judged by the window control selection unit 2202, and the data generated from the 3D window movement execution unit 2212, the 3D window rotation execution unit 2206 and the 3D window enlargement/scale-down execution unit 2207 are used for the 3D window generation unit 2203. The generated data are the coordinates of the apexes A, B of the 3D window with respect to the reference scene coordinate system $Z_1$ displayed on the display, the Eulerian angles of rotation of the coordinate system $Z_2$ with respect to the coordinate system $Z_1$ of the 3D window (the coordinates of the remaining six points can be obtained easily by calculation if the coordinates of the two points and the angle of rotation of the window are defined), the difference of distance between the origin $O_1$ of the reference scene coordinate system $Z_1$ and the origin $O_2$ of the window coordinate system $Z_2$ 2302 (calculated as the value on $Z_1$) and the difference of distance between the origin $O_3$ of the screen coordinate system $Z_3$ 2303 and the origin $O_2$ of the coordinate system $Z_2$ 2302 (calculated as the value on $Z_1$). The coordinates of the 3D window 2304 on the display screen 2306 are calculated from these data and are displayed on the display. The 3D window internal graphic data generation unit 2204 calculates the range of the graphic data 2305 displayed inside the 3D window on the basis of the coordinates of the apexes A, B of the 3D window corresponding to the window coordinate system $Z_2$ 2302, projects the resulting coordinate values on the screen coordinate system 2306, converts them to the coordinate values for the display, and displays them on the display. Incidentally, the kind of the operations of this 3D window internal graphic data generation unit 2204 is judged by the window control selection unit 2202. The data processed by the 3D window scroll execution unit 2205, the 3D window rotation execution unit 2206 and the 3D window enlargement/scale-down unit 2207 are used.

Reference numeral 2208 denotes an icon position judgement unit, which judges the positions of various operation icons. The data of the icons are sent to the 3D window data management unit 2207. Reference numeral 2210 denotes an individual application program management unit, and the graphic data inside the 3D window is generated by the 3D window internal graphic data generation unit 2204 in accordance with this individual application program. Reference numeral 2211 denotes a display.

Figure 24:
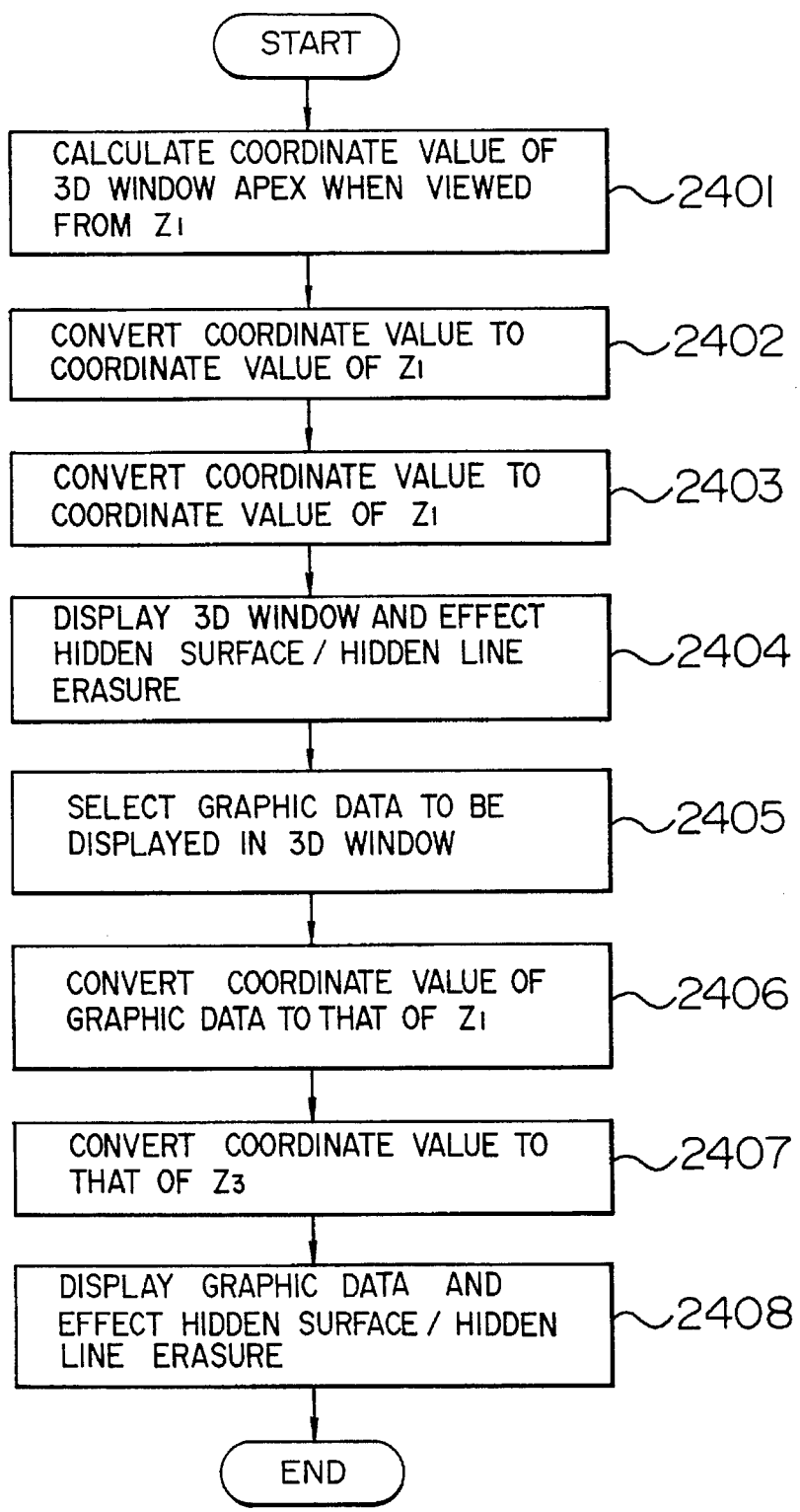
FIG. 24 is a flowchart showing the flow of a three-dimensional window.

This display algorithm is shown in FIG. 24.

First of all, the coordinates of the apexs of the 3D window as viewed from the reference scene coordinate system $Z_1$ 2301 are calculated (step 2401). Formula for converting the coordinate value $(X_{i2}, Y_{i2}, Z_{i2})$ (i=1, 2, ..., 8) corresponding to the window coordinate system $Z_2$ 2302 of each apex to the coordinate value $(X_1, Y_1, Z_1)$ corresponding to the reference scene $Z_1$ 2301 is given as follows:

$$\begin{bmatrix} X_1 \\ Y_1 \\ Z_1 \end{bmatrix} = \begin{bmatrix} C\phi C\theta C\varphi - S\phi S\varphi & S\phi C\theta C\varphi + C\phi S\varphi & -S\theta C\varphi \\ -C\phi C\theta S\varphi - S\phi C\varphi & -S\phi C\theta S\varphi + C\phi C\varphi & S\theta S\varphi \\ C\phi S\theta & S\phi S\theta & C\theta \end{bmatrix} \begin{bmatrix} \lambda_x(X_{i2} - \Delta X_2) \\ \lambda_y(Y_{i1} - \Delta Y_2) \\ \lambda_z(Z_{i2} - \Delta Z_2) \end{bmatrix} + \begin{bmatrix} \Delta X_1 \\ \Delta Y_1 \\ \Delta Z_1 \end{bmatrix} \quad 2\text{-}1$$

$C = \cos, S = \sin$

Here, $\Delta X_2$, $\Delta Y_2$ and $\Delta Z_2$ are the differences of distance between $O_1$ and $O_2$, $\lambda_x$, $\lambda_y$ and $\lambda_z$ are scaling coefficients of $Z_2$ 2302 with respect to $Z_1$, and $\theta$, $\phi$ and $\varphi$ are the Eulerian angles. Next, the coordinates calculated by the formula 2-1 are projected on the screen coordinate system $Z_3$ 2303 (step 2402). Assuming that the X coordinate axis $x_3$ of $Z_3$ 2303 and the X coordinate axis $x_1$ of $Z_1$ 2301 are parallel, the Y coordinate axis $y_3$ of $Z_3$ 2303 and the Z coordinate axis $z_1$ of $Z_1$ 2301 are parallel and the difference between the origin $O_3$ of $Z_3$ 2303 and the origin $O_1$ of $Z_1$ 2301 is $\Delta X_1$, $\Delta Y_1$ as viewed from $Z_1$ 2301, the coordinate values $(X_1, Y_1, Z_1)$ of the window apexes are projected to the coordinate values $(X_3, Y_3)$ on $Z_3$ 2302 and converted (step 2403) in accordance with the following formula:

$$X_3 = \frac{Y_f}{Y_1 - Y_f}(X_1 - X_f) + X_f + \Delta X_1 \qquad 2\text{-}2$$

$$Y_3 = \frac{(X_3^2 + Y_f^2)^{1/2}}{\{(X_1 - X_f)^2 + (Y_1 - Y_f)^2\}^{1/2}}(Z_1 - Z_f) + Z_f + \Delta Z_1$$

In the formula 2-2, $(X_f, Y_f, Z_f)$ represents the distance between the screen and the imaginary eye position (calculation value on $Z_1$ 2301). $(\Delta X_1, \Delta Y_1)$ represents the difference of the distance between the origin $O_1$ of $Z_1$ 2301 and the origin $O_2$ of $Z_2$ 2302. The calculated coordinate value $(X_3, Y_3)$ is transferred to, and displayed by, the display. At this time, the perspective feeling is calculated by effecting hidden surface/line removal (step 2404). Arbitrary methods may be used for hidden surface/line removal by the coordinate data. Next, the graphic data to be displayed in the 3D window is displayed on the display. First, the range to be displayed inside the 3D window is calculated (step 2405). This can be obtained easily by comparing the apexes A, B of the 3D window with respect to the window coordinate system $Z_2$ 2302. Next, the coordinates of the 3D data corresponding to $Z_1$ 2301 are calculated by the formula 2-1 (step 2406). The coordinate values calculated in accordance with the formula 2-1 are converted to the coordinate value for $Z_3$ 2303 in accordance with the formula 2-2. The coordinate value $(X_3, Y_3)$ calculated in this way is transferred to, and displayed on, the display. Furthermore, the perspective feeling is calculated by effecting hidden surface/line removal (step 2408).

Figure 25:
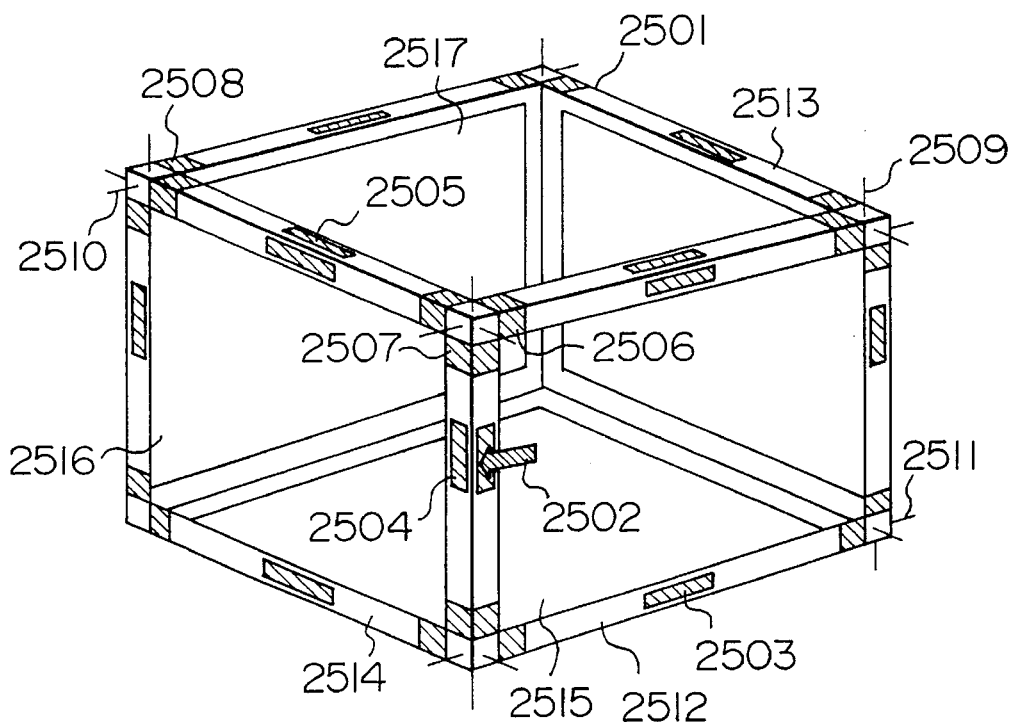
FIG. 25 is an explanatory view showing a display image of a three-dimensional window and a window operation icon.

Next, the operation method of the 3D window will be explained. FIG. 25 shows the display image of the 3D window. Various operation icons (hereinafter called the "OP icons") are provided to the window. To operate the 3D window 2501, the icons of scroll bars 2503, 2504, 2505, enlargement/scale-down selectors 2506, 2507, 2508, rotation rods 2509, 2510, 2511 and rails 2512, 2513, 2514 are used. Reference numeral 2502 denotes an icon for pointing and reference numerals 2515 and 2516 denote side surfaces. Whether or not these OP icons are selected by the pointing icon (hereinafter called "PT icon") 2502 can be determined by calculating the inclusion relation of the operation OP icons determined by the coordinates of the PT icon 2502 on the reference scene coordinate system $Z_1$ 2301 and the coordinate values of the eight window apexes.

When the scroll bar is selected by the PT icon 2502, the 3D window scroll execution unit 2205 shown in FIG. 23 is actuated. When the scroll bar 2503 is moved along the rail 2512, the range of the window coordinate system $Z_2$ that can be displayed inside the 3D window is updated by parallel motion. In this case, the display range is expressed by the following relation:

$$X_2 < X < X_{2'}$$

$$Y_2 + \delta Y_2 < Y < Y_{2'} + \delta Y_2 \qquad 2\text{-}3$$

$$Z_2 < Z < Z_{2'}$$

Here, $X_2$, $Y_2$ and $Z_2$ represent minimum values of the display range, $X_{2'}$, $Y_{2'}$, $Z_{2'}$, represent maximum values of the display range, and $Y_2$ represents the moving distance by scrolling. The scroll bars 2503, 2504 and 2505 cause parallel motion along the Y coordinate axis $y_2$ of $Z_2$, the Z coordinate axis $z_2$ of $Z_2$ and the X coordinate axis $x_2$ of $Z_2$ 2302, respectively. When scroll is made, the 3D internal graphic data generation unit 2204 shown in FIG. 22 is actuated, and the graphic data existing inside the range which is set afresh are re-calculated and displayed on the display.

When the enlargement/scale-down selectors 2506, 2507, 2508 are selected by the PT icon 2502, the 3D window enlargement/scale-down execution unit 2207 is actuated. When the enlargement/scale-down selector 2506 is selected, the side surface 2515 causes parallel motion along the X coordinate axis $x_2$ of $Z_2$ 2302 while keeping the relation in which it crosses vertically $x_2$. When the enlargement/scale-down selector 2507 is selected, the side surface 2516 causes parallel motion along the Y coordinate axis $y_2$ of $Z_2$ while keeping the relation in which it crosses vertically $y_2$. When the enlargement/scale-down selector 2508 is selected, the side surface 2517 causes parallel motion along the Z axis $z_2$ while keeping the relation in which it crosses vertically $z_2$. In this way, the size of the 3D window is changed, and the display range of the data by the 3D window is enlarged or scaled down. At this time, the 3D internal graphic data generation unit 2204 is again actuated, and the 3D data existing inside the display range of the 3D window is re-calculated and displayed on the display.

When the rods 2509, 2510, 2511 are selected, the 3D window rotation execution unit 2206 shown in FIG. 22 is actuated. When the rod 2509 is selected, the 3D window rotates with the plane center of the side surface 2517 as the axis. When the rod 2510 is selected, the 3D window rotates with the plane center of the side surface 2516 as the axis. When the rod 2511 is selected, the 3D window rotates with the center of the side surface 2525 as the axis. Assuming that the coordinate system before the rotation is $Z_2$, the coordinate system after the rotation is $Z_2$, and the coordinates $(X_2, Y_2, Z_2)$ of $Z_2$ are changed to the coordinates $(X_{2'}, Y_{2'}, Z_{2'})$ of $Z_{2'}$, the coordinates $(X_{2'}, Y_{2'}, Z_{2'})$ can be expressed as follows:

$$\begin{bmatrix} X_{2'} \\ Y_{2'} \\ Z_{2'} \end{bmatrix} = \begin{bmatrix} C\phi C\theta C\varphi - S\phi S\varphi & S\phi C\theta C\varphi + C\phi S\varphi & -S\theta C\varphi \\ -C\phi C\theta S\varphi - S\phi C\varphi & -S\phi C\theta S\varphi + C\phi C\varphi & S\theta S\varphi \\ C\phi S\theta & S\phi S\theta & C\theta \end{bmatrix} \begin{bmatrix} X_2 \\ Y_2 \\ Z_2 \end{bmatrix} \qquad 2\text{-}4$$

Here, symbols $\theta$, $\phi$ and $\varphi$ represent the Eulerian angles. At this time, the 3D internal graphic data generation unit 2204 is again actuated, and the coordinates due to the rotation of the 3D data are calculated in accordance with the formula 2-4 and are displayed on the display.

When the rails 2512, 2513, 2514 are selected, the 3D window movement execution unit 2212 shown in FIG. 22 is actuated and the 3D window is moved along the movement of the PT icon. At this time, the coordinates of the origin of $Z_3$ relative to $Z_1$ 2301 are changed, but no change occurs in the data in the window.

In the way described above, the object displayed in the window can be moved by selecting the scroll bars and the rods on the side surfaces of the window and moving the window. The display range can be enlarged or reduced by selecting the enlargement/scale-down selector. Furthermore, the 3D window can be picked and moved freely by the rails. The OP icons shown in FIG. 25 need not be kept always ON. The OP icons are turned OFF after a predetermined time by managing the access time to the 3D window in the graphic processor, and are displayed once again when the PT icons make access to the 3D window.

It is possible to display a plurality of 3D windows in the display and to display the graphic data in the windows. It is necessary at this time to manage to which 3D windows the access is made when the user makes access to the 3D windows by the use of the PT icon. Next, the method of managing the 3D windows will be explained.

The window management is conducted by the 3D window data management unit 2209 shown in FIG. 22 by the use of the data of the icon position judgement unit 2208. To this end is used a management table (3D window management table) shown in FIG. 26. A window number 2601 is applied to the sequence of the generation of the 3D windows. (Reference numeral 2608 denotes an erasure flag.) There is the possibility that when a 3D window is generated, it overlaps with other 3D window. Therefore, any interference between the 3D windows is checked by comparing the display coordinates of the window relative to the reference scene coordinate system $Z_1$. If any overlap exists, the top display priority is assigned to the 3D window which is generated most afresh. At this time, "1" is stored in the priority data 2606, and the window numbers of the overlapping 3D windows having a lower priority are stored in the window overlap data 2606. As to other overlapping 3D windows, they are updated as n←N+1 when the priority data is N. It is possible to know to which 3D window the access is made by the pointing icon PT, by looking into this 3D window management table.

The window management table stores the coordinate values 2602 of the graphic data display range corresponding to the window coordinate system $Z_2$ 2302, the coordinate value of the window display corresponding to the reference scene coordinate system $Z_1$ 2301 and the angle of rotation (Eulerian angles) 2603 of $Z_2$ 2302 relative to $Z_1$ 2301. The display range of the graphic data displayed inside the 3D window can be known by referring to the coordinate value 2602. The inclusion relation between the PT icon and the 3D windows and the mutual overlap of the 3D windows can be calculated by referring to the coordinate values and the angles of rotation 2603.

When the 3D windows are erased from the display, the erasure flag 2608 is turned ON and this ON represents the erasure of the 3D windows. When the erasure flag 2608 is turned OFF, the 3D windows are again displayed.

Furthermore, the window management table can allot inherent programs to the individual 3D windows disposed in the individual application program management unit 2210 shown in FIG. 22 as it has even numbers 2605. This will be explained with reference to FIG. 17. The 3D window 1702 displays lay-down data of LAN and the 3D window 1703 displays lay-down data of gas pipelines.

It will be assumed that the PT icon enters the 3D window 1702. Then, the 3D window which is accessed by the PT icon is retrieved by referring to the window management table. This operation corresponds to the retrieval of the 3D window which includes therein the position coordinates of the PT icon and has priority data "1". The even number 1005 is determined from the data of the 3D window thus retrieved, and the corresponding program is retrieved from the individual application program management unit 610. Next, this unit 610 is actuated. In FIG. 17, it will be assumed that the 3D windows 1702 and 1703 are linked with the program for calculating the operation of LAN and with the program for calculating the pressure change of the gas pipeline with time through the even number 2605, respectively. When the PT icon 1704 makes access to the 3D window 1702, the program for calculating the operation state of LAN is actuated. When the PT icon makes access to the 3D window 1703, on the contrary, the program for calculating the pressure change of the gas pipeline with time is actuated. When the PT icon leaves the 3D window in either cases, the execution of the program is terminated.

Next, an application example of the 3D window system as the second embodiment of the present invention will be explained. FIG. 17 shows the scene 101 of a building as the reference scene. The 3D windows 1702 and 1703 are also shown in the drawing, and display the LAN and the lay-down state of the gas pipeline inside the building, respectively. Approach and access to the 3D windows is made by operating the PT icon 1704. the operation method of the PT icon 1704 is hereby omitted. Whether or not the PT icon 1704 shifts into the 3D windows is judged in the following way. If the coordinate value of the PT icon 1704 in the reference scene coordinate system $Z_1$ 2301 is $(X_{i1}, Y_{i1}, Z_{i1})$, the new coordinates $(X_{i1'}, Y_{i1'}, Z_{i1'})$ at the destination of movement can be calculated as follows:

$$X_{i1'} = X_{i1} + v_x \cdot \Delta t$$

$$Y_{i1'} = Y_{i1} + v_y \cdot \Delta t$$

$$Z_{i1'} = Z_{i1} + v_z \cdot \Delta t$$

Here, symbols $v_x$, $v_y$ and $v_z$ represent the moving speed vectors of the PT icon 1704 along $Z_1$ 2301, and $\Delta t$ represents a sampling time interval. It will be assumed that the coordinates obtained by converting the coordinates $(X_1, Y_1, Z_1)$ of the PT icon 1704 relative to the reference scene coordinate system $Z_1$ 2301 to the window coordinate system $Z_2$ 2301 are $(X_2, Y_2, Z_2)$. At this time, the 3D window satisfying the following relation is selected by retrieving the display coordinates 2602 of the window corresponding to $Z_2$ of the 3D window management table:

$$X_1^1 < X_2 < X_2^2$$

$$Y_1^1 < Y_2 < Y_2^2$$

$$Z_1^1 < Z_2 < Z_2^2$$

Here, $(X_1^1, Y_1^1, Z_1^2)$ is the coordinates of the minimum value of the window display range, and $(X_1^2, Y_1^2, Z_1^2)$ is the coordinates of the maximum value of the window display range. The program corresponding to the even number of the 3D window is activated. Accordingly, the program linked with the reference scene 101 is activated before the PT icon 1704 moves into the 3D window, and after the PT icon 1704 moves into the 3D windows 1702 and 1703, the programs associated with the 3D windows are activated. By applying this conception, the 3D windows are believed to display mutually irrelevant graphic data and to have mutually different worlds. Then, it is possible for the user to select the world in which he is interested in and to execute the program associated with that world. This is believed effective in a virtual reality system, or the like.

Figure 27:
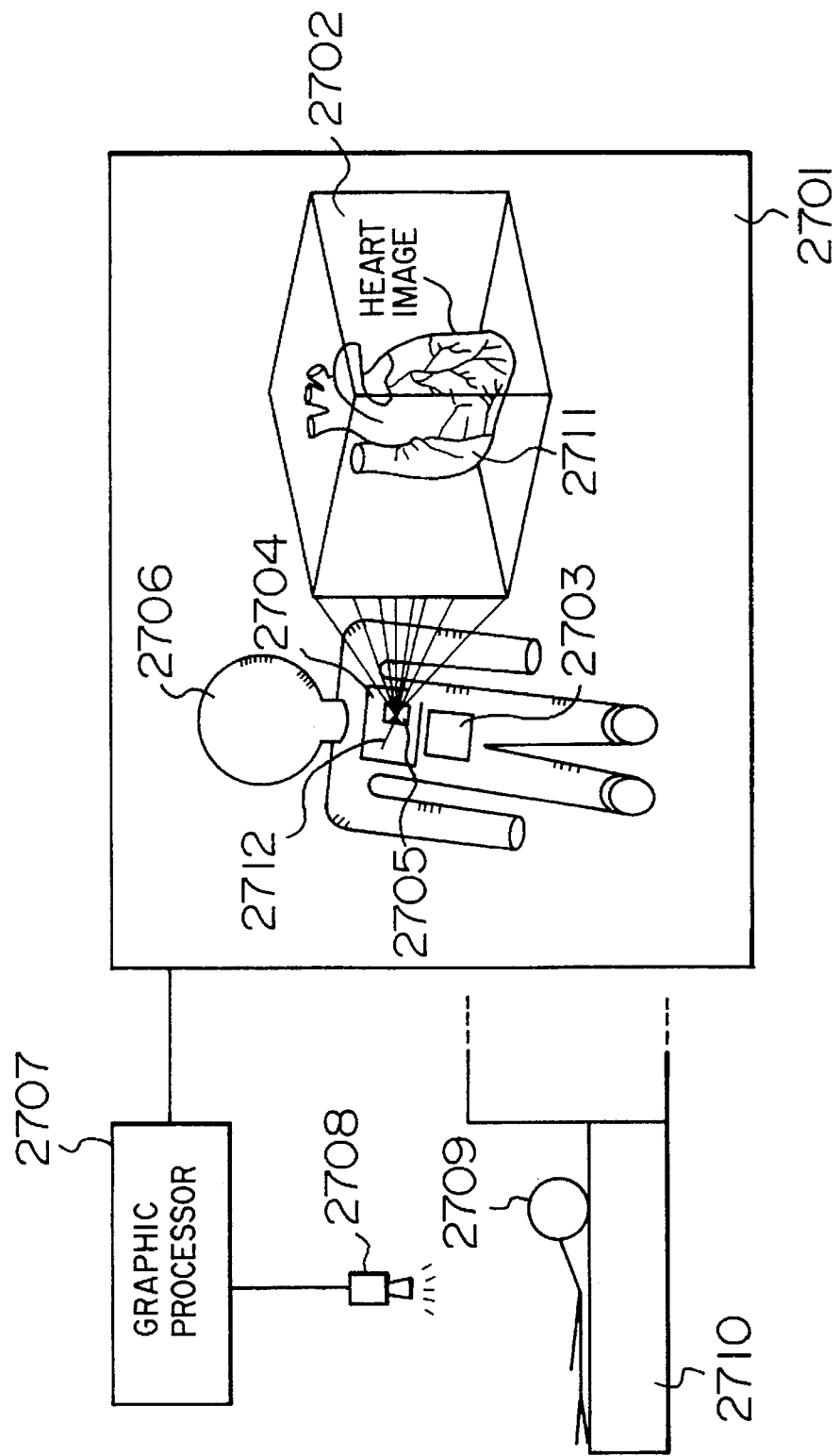
FIG. 27 is an explanatory view showing an application of the three-dimensional window system to a medical CT system.

Next, another application example of the second embodiment of the present invention relating to the display of the image of an organ acquired by computer tomography (CT) will be explained. As shown in FIG. 27, the image of a person 2709 stored in a CT scanner 2710 is inputted by operating a camera 2708, and the positions of the heart, stomach and lung as the typical organs are recognized by a graphic processor 2707 and are schematically displayed (2706). There is no problem, in particular, to the method of recognition. When these organ schemas 2703, 2704, 2705 are selected by the PT icon 2712, the CT scanner 2710 scans the recognized organ and the result is reconstructed as three-dimensional graphic data and displayed in the 3D window 2702 of the display 2701. The organ displayed in the 3D window is constituted by complicated curve planes, and it is not easy to make interference check, rotation and movement of such planes. However, since clipping of the 3D window is relatively easy as described already, the image operation becomes easier. FIG. 27 shows the CT scanning image 2711 of the heart inside the 3D window 2702 and this operation can be carried out similarly for the other organs.

Figure 28:
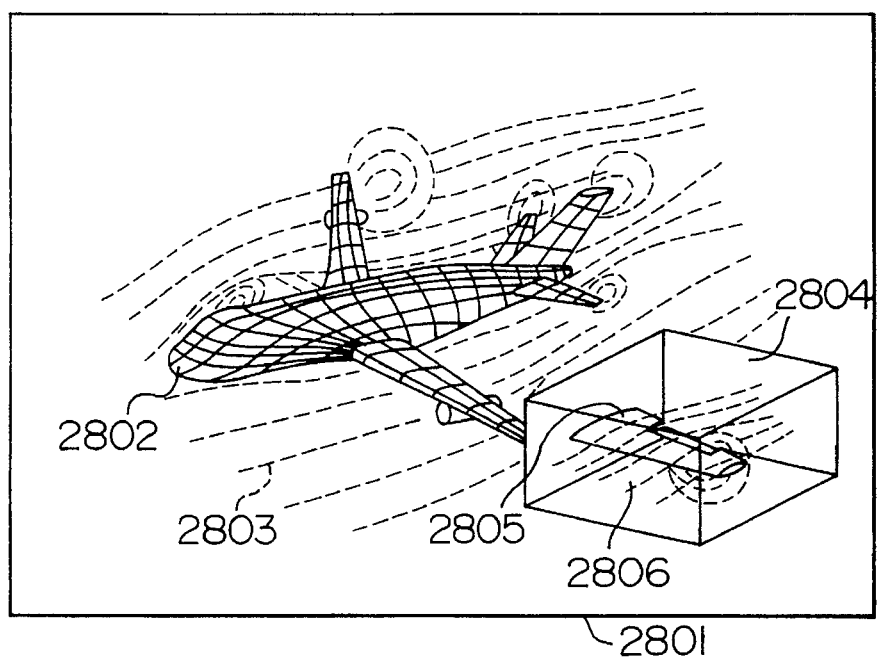
FIG. 28 is an explanatory view showing an application of the three-dimensional window system to numeric value simulation.
Figure 26:
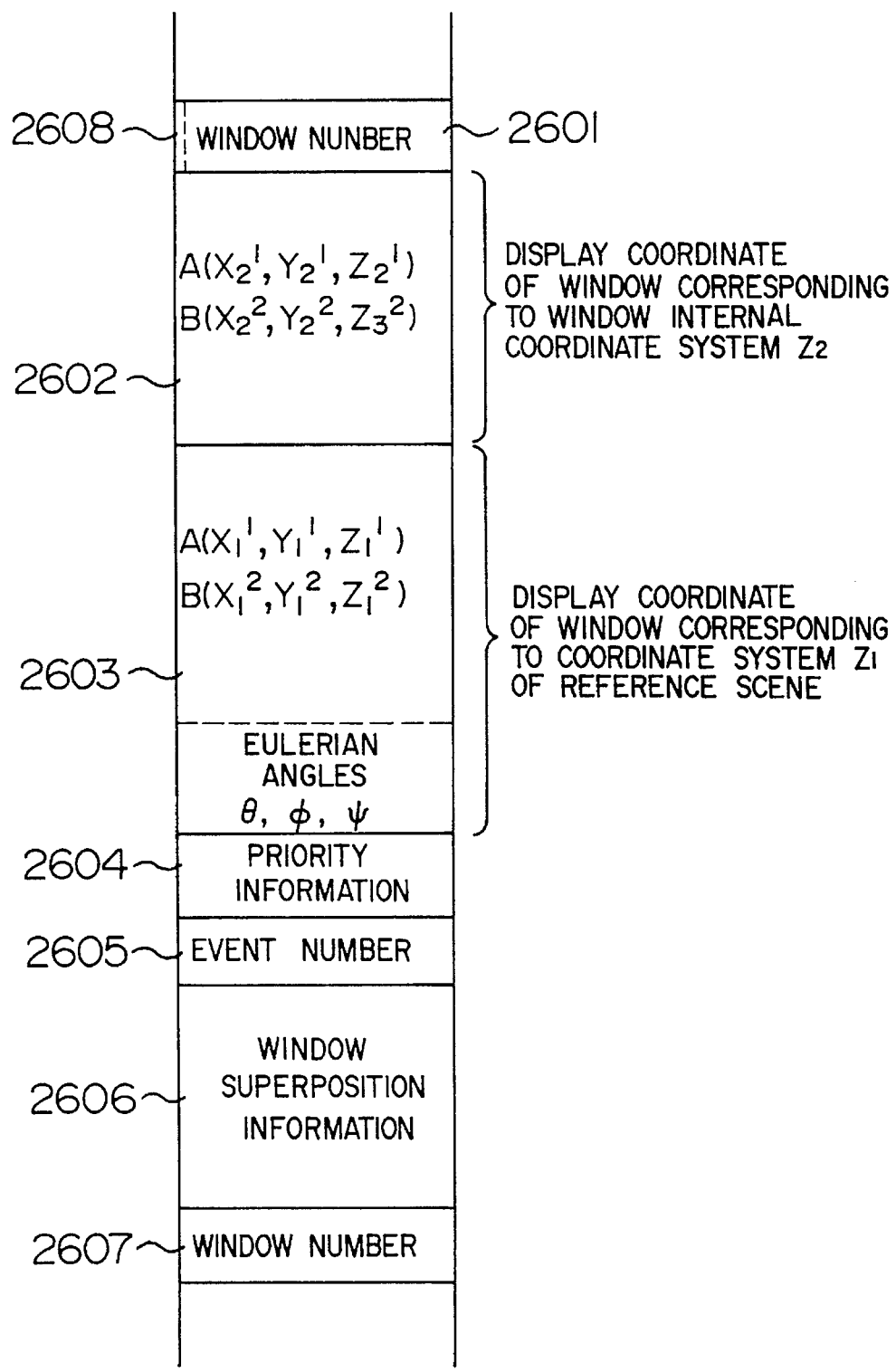
FIG. 26 is a table showing the content of a three-dimensional window management table.

Next, still another application example of the second embodiment of the present invention directed to simulation of the air flow around a structure will be explained. When the structure is large in size, its detailed data cannot be displayed fully and watched in the display. Even when a partial view is displayed on the display, the overall image of the structure is difficult to grasp. In FIG. 28, a rough shape of an airplane 2802 and a simulation result 2803 are displayed by scaling, and a detailed portion of the airplane body and the simulation result 2806 relating to that portion are shown in the 3D window 2804. This represents the image in which another new numeric value air channel is realized in a numeric value air channel accomplished by a computer system. The generation method of the window at this time is as follows. First of all, the 3D window is displayed in the screen at a predetermined ratio to the size of the display screen. The size of the 3D window is then adjusted by selecting the enlargement/scale-down selectors 2506, 2507, 2508 in FIG. 25. The 3D window is rotated by selecting the rotation rods 2509, 2510, 2511 so that the detailed data can be watched more easily. After the window is set in this way, the keyboard or mouse keys are pushed to display the detailed shape 2805 of the airplane model in the 3D window as well as the simulation result 2806.

Although the 3D window has been explained with reference to the rectangular parallelepiped such as shown in FIG. 25, the 3D window is not limited thereto but may be constituted by other three-dimensional shapes.

According to the second embodiment of the present invention, it is not necessary to directly point the graphic data having complicated shapes while effecting the interference check, but the movement and rotation of the graphic data can be attained by the movement and rotation of the window by displaying the graphic data inside the 3D window. At this time, the selection of the scroll bars, the enlargement/scale-down selectors and the rods using the PT icon for pointing is easy, and a high speed algorithm can be applied. It is also possible to execute the control by regarding the individual 3D windows as the different worlds, to display the worlds in which the system user is interested, to select one of them, and to activate the program associated with the selected world.

We claim:

1. A graphic data processing system comprising:

a display having a two-dimensional display surface;

means for displaying a three-dimensional window on said display, and displaying graphic data in three dimensions in said three dimensional window, the three-dimensional window being configured as a rectangular parallelepiped;

wherein the graphic data processing system includes a screen coordinate system for displaying the three-dimensional window, a reference scene coordinate system, and a characteristic window coordinate system which is defined separately from the reference scene coordinate system; and wherein coordinate values of the characteristic window coordinate system are converted in order to be displayed in the screen coordinate system.

2. A graphic data processing system according to claim 1, wherein when displaying a plurality of three-dimensional windows each containing graphic data, the coordinate values of the characteristic window coordinate system which have been converted are compared with coordinates in the reference scene coordinate system in order to check for interference among the graphic data contained in the plurality of three-dimensional windows.

3. A graphic data processing system according to claim 2, which further comprises:

scroll bar icons for selection of scrolling graphic data inside said three-dimensional window, enlargement/scale-down icons for selection of enlarging/scaling down said three-dimensional window, rod icons for selection of rotating said three-dimensional window and rail icons for selection of moving said three-dimensional window, and a pointing icon for selecting said scroll bar icons, enlargement/scale-down icons, rod icons and rail icons;

three-dimensional window scroll execution means for scrolling graphic data inside said three-dimensional window when said scroll bar icons are moved;

three-dimensional window enlargement/scale-down execution means for enlarging or scaling down graphic data displayed inside said three-dimensional window together with said three-dimensional window when said enlargement/scale-down icons are selected;

three-dimensional window rotation execution means for rotating graphic data displayed inside said three-dimensional window together with said three-dimensional window when said rod icons are selected; and three-dimensional window movement means for moving said three-dimensional window without changing the data display inside said three-dimensional window when said rail icons are selected.

4. A graphic data processing system according to claim 1, which further comprises:

scroll bar icons for selection of scrolling graphic data inside said three-dimensional window, enlargement/scale-down icons for selection of enlarging/scaling down said three-dimensional window, rod icons for selection of rotating said three-dimensional window and rail icons for selection of moving said three-dimensional window, and a pointing icon for selecting said scroll bar icons, enlargement/scale-down icons, rod icons and rail icons;

three-dimensional window scroll execution means for scrolling graphic data inside said three-dimensional window when said scroll bar icons are moved;

three-dimensional window enlargement/scale-down execution means for enlarging or scaling down graphic data displayed inside said three-dimensional window together with said three-dimensional window when said enlargement/scale-down icons are selected;

three-dimensional window rotation execution means for rotating graphic data displayed inside said three-dimensional window together with said three-dimensional when said rod icons are selected; and three-dimensional window movement means for moving said three-dimensional window without changing the data display inside said three-dimensional window when said rail icons are selected.

5. A graphic data processing system according to claim 4, wherein graphic data displayed inside said three-dimensional window is moved with the movement of said three-dimensional window and wherein said three-dimensional window is moved so that graphic data displayed inside said three-dimensional window does not interfere with different graphic data inside another three-dimensional window.

6. A graphic data processing system according to claim 5, which further comprises window management means for preferentially displaying said three-dimensional window having higher priority and graphic data displayed inside said three-dimensional window when an access is made to said three-dimensional windows by the use of a window management table which stores a priority value for each of said three-dimensional windows.

7. A graphic data processing system according to claim 6, wherein information for linking a particular program with each of said three-dimensional windows is stored in said window management table, and said window management means activates said program by referring to said link information for said three-dimensional window having highest priority.

8. A graphic data processing system according to claim 1, which further comprises window management means for preferentially displaying said three-dimensional window having higher priority and graphic data displayed inside said three-dimensional window when an access is made to said three-dimensional windows by the use of a window management table which stores a priority value for each of said three-dimensional windows.

9. A graphic data processing system according to claim 8, wherein information for linking a particular program with each of said three-dimensional windows is stored in said window management table, and said window management means activates said program by referring to said link information for said three-dimensional window having highest priority.

* * * * *